US012602678B2

(12) United States Patent
Best et al.

(10) Patent No.: US 12,602,678 B2
(45) Date of Patent: Apr. 14, 2026

(54) CONFIGURABLE CORRECTIONAL FACILITY COMPUTER KIOSK SYSTEMS AND METHODS FOR PORTABLE ELECTRONIC DEVICE ACCESS AND MANAGEMENT

(71) Applicant: HomeWAV, LLC, St. Louis, MO (US)

(72) Inventors: John Best, St. Louis, MO (US); Seyedmorteza Sahebkarkhorasani, St. Louis, MO (US)

(73) Assignee: HomeWAV, LLC, St. Louis, MO (US)

( * ) Notice: Subject to any disclaimer, the term of this patent is extended or adjusted under 35 U.S.C. 154(b) by 319 days.

(21) Appl. No.: 17/201,918

(22) Filed: Mar. 15, 2021

(65) Prior Publication Data

US 2021/0287197 A1     Sep. 16, 2021

Related U.S. Application Data

(60) Provisional application No. 62/990,113, filed on Mar. 16, 2020.

(51) Int. Cl.
*G06Q 20/20* (2012.01)
*G06F 3/04847* (2022.01)
(Continued)

(52) U.S. Cl.
CPC ............. *G06Q 20/206* (2013.01); *G06F 8/65* (2013.01); *G06F 21/31* (2013.01); *G06Q 20/18* (2013.01);
(Continued)

(58) Field of Classification Search
CPC .... G06Q 20/206; G06Q 20/18; G06Q 20/203; G06Q 50/26; G06Q 20/127;
(Continued)

(56) References Cited

U.S. PATENT DOCUMENTS 5,711,231 A     1/1998  Couvrette et al.
6,130,521 A  *  10/2000  Collins ................. H02J 7/0044
                                                          379/454
(Continued)

FOREIGN PATENT DOCUMENTS

WO     2012174324 A1    12/2012
WO     2017142902 A1     8/2017

OTHER PUBLICATIONS

Defition of "fixed" from www.dictionary.com, retrieved on Aug. 7, 2023 from www.dictionary.com/browse/fixed.*
(Continued)

*Primary Examiner* — Peter Ludwig
(74) *Attorney, Agent, or Firm* — Armstrong Teasdale LLP

(57) ABSTRACT

Configurable kiosk devices for correctional facilities flexibly accommodate any number n of tablet computer devices with secure access measures, safeguards, and accounting needed by correctional facilities with capability of real-time management and oversight. Intelligent battery charging capability and energy conservation features are incorporated in relatively compact, and space saving kiosk configurations. Retrofit reconfiguration of the kiosk device is possible at relatively low cost to accommodate additional numbers of tablet computer devices and different sizes of tablet computer devices.

47 Claims, 24 Drawing Sheets

(51) Int. Cl.

| | |
|---|---|
| *G06F 8/65* | (2018.01) |
| *G06F 21/31* | (2013.01) |
| *G06Q 20/18* | (2012.01) |
| *G06Q 50/26* | (2024.01) |
| *G07C 9/00* | (2020.01) |
| *G07C 9/38* | (2020.01) |
| *H02J 7/00* | (2026.01) |
| *H04N 7/14* | (2006.01) |

(52) U.S. Cl.
CPC .......... *G06Q 20/203* (2013.01); *G06Q 50/26* (2013.01); *G07C 9/00571* (2013.01); *G07C 9/38* (2020.01); *H02J 7/0013* (2013.01); *H02J 7/0044* (2013.01); *G06F 3/04847* (2013.01); *H04N 7/147* (2013.01)

(58) Field of Classification Search
CPC .......... G06Q 20/4012; G06Q 20/4014; G06Q 20/40145; G06F 8/65; G06F 21/31; G06F 3/04847; G06F 8/60; G07C 9/00571; G07C 9/38; G07C 9/00896; H02J 7/0013; H02J 7/0044; H04N 7/147; H04N 2007/145; H04N 7/155; Y02D 10/00; G07F 9/002; G07F 17/0042; G07F 17/12
See application file for complete search history.

(56) References Cited

U.S. PATENT DOCUMENTS

| | | | | |
|---|---|---|---|---|
| 7,374,258 | B2 * | 5/2008 | Bowron .................... | G07F 9/10 |
| | | | | 312/7.2 |
| 8,904,198 | B1 | 12/2014 | Pinto et al. | |
| 9,030,292 | B2 | 5/2015 | Thorgersrud et al. | |
| 9,083,850 | B1 | 7/2015 | Higgs | |
| 9,094,569 | B1 | 7/2015 | Humphries | |
| 9,106,789 | B1 | 8/2015 | Shipman, Jr. et al. | |
| 9,124,763 | B2 | 9/2015 | Humphries | |
| 9,680,317 | B2 | 6/2017 | Roberts | |
| 9,749,863 | B2 | 8/2017 | Torgersrud et al. | |
| 9,800,830 | B2 | 10/2017 | Humphries | |
| 9,826,003 | B1 | 11/2017 | Thomasson et al. | |
| 9,973,810 | B2 | 5/2018 | Hodge | |
| 10,084,329 | B2 | 9/2018 | Hamilton et al. | |
| 10,096,183 | B2 | 10/2018 | Nitu et al. | |
| 10,217,311 | B2 | 2/2019 | Peters et al. | |
| 10,225,734 | B1 | 3/2019 | Shipman et al. | |
| 10,275,811 | B2 | 4/2019 | Collins | |
| 10,296,994 | B2 | 5/2019 | Hodge et al. | |
| 10,313,632 | B2 | 6/2019 | Humphries | |
| 10,321,094 | B2 | 6/2019 | Hodge et al. | |
| 10,417,681 | B2 | 9/2019 | Butler et al. | |
| 10,476,285 | B2 | 11/2019 | Ergun et al. | |
| 10,636,067 | B2 * | 4/2020 | Collins .............. | G06Q 30/0601 |
| 10,678,302 | B1 | 6/2020 | Shipman, Jr. et al. | |
| 11,457,005 | B1 | 9/2022 | Shapiro | |
| 11,482,067 | B2 * | 10/2022 | Forutanpour ...... | G06Q 30/0278 |
| 11,619,971 | B1 * | 4/2023 | Passe ................ | H04M 1/72409 |
| | | | | 361/679.41 |
| 11,972,652 | B1 | 4/2024 | Shipman, Jr. et al. | |
| 12,068,625 | B1 | 8/2024 | Shipman, Jr. et al. | |
| 12,339,712 | B1 | 6/2025 | Shipman, Jr. et al. | |
| 12,395,368 | B2 | 8/2025 | Sahebkarkhorasani et al. | |
| 2010/0228405 | A1 | 9/2010 | Morgal et al. | |
| 2012/0078413 | A1 | 3/2012 | Baker, Jr. | |
| 2012/0241464 | A1 * | 9/2012 | Adams .................... | G07F 11/54 |
| | | | | 221/277 |
| 2013/0083664 | A1 * | 4/2013 | Harris ..................... | H04L 43/00 |
| | | | | 370/241 |
| 2013/0263227 | A1 | 10/2013 | Gongaware et al. | |
| 2013/0297844 | A1 | 11/2013 | Rosenberg et al. | |
| 2014/0004819 | A1 * | 1/2014 | Brent .................... | H04M 15/28 |
| | | | | 455/406 |
| 2014/0266725 | A1 * | 9/2014 | Berglund ............. | G08B 13/149 |
| | | | | 340/568.8 |
| 2014/0273929 | A1 | 9/2014 | Torgersrud | |
| 2014/0280913 | A1 | 9/2014 | Karren et al. | |
| 2016/0135618 | A1 * | 5/2016 | Alvarez .................... | E05C 3/12 |
| | | | | 211/59.2 |
| 2017/0033579 | A1 * | 2/2017 | Maguire ............... | H02J 7/0044 |
| 2017/0116571 | A1 * | 4/2017 | Tammattabattula ......................... | |
| | | | | G06Q 10/0836 |
| 2017/0201716 | A1 | 7/2017 | Humphries | |
| 2017/0289758 | A1 * | 10/2017 | Shiryan ................. | H04W 4/023 |
| 2018/0287976 | A1 | 10/2018 | Hochstein | |
| 2018/0375354 | A1 * | 12/2018 | Ergun .................... | G06F 1/189 |
| 2019/0065286 | A1 | 2/2019 | Hodge | |
| 2019/0362586 | A1 * | 11/2019 | Peters .................. | G07F 17/005 |

OTHER PUBLICATIONS

"TI"—(Apr. 16, 2018). Designing dual-input PoE PD system power redundancy, smooth transition, & power sharing applications. Texas Instruments, Found on Apr. 23, 2024 at https://www.ti.com/video/5771489270001.*

JPay (archived back to at least Apr. 20, 2019). JP5 Tablets (retrieved on Aug. 16, 2024, at https://web.archive.org/web/20190420161318/https://www.jpay.com/pmusic.aspx) (hereinafter referred to as "JPay").*

M3 Solutions Technologies Inc., NetSpot Tablet Station Datasheet, 2015, p. 1-2.

International Search Report and Written Opinion issued in PCT/US2021/022372 dated Jun. 11, 2021 (15 pages).

* cited by examiner

200

200

400

402
Configure Kiosk with n Slots

404
Detect Kiosk Configuration

406
Accept Facility and User Data

414
Deactivate Charger

408
Accept Tablet Computer Devices

412
Charge Tablet Devices

410
Lock Tablet Computer Device

418
Deactivate Charger

416
Check-Out Devices to Authorized User

420
Generate Admin Alert

422
Check-In Devices to Kiosk

424
Detect Re-Configuration

Figure 20:
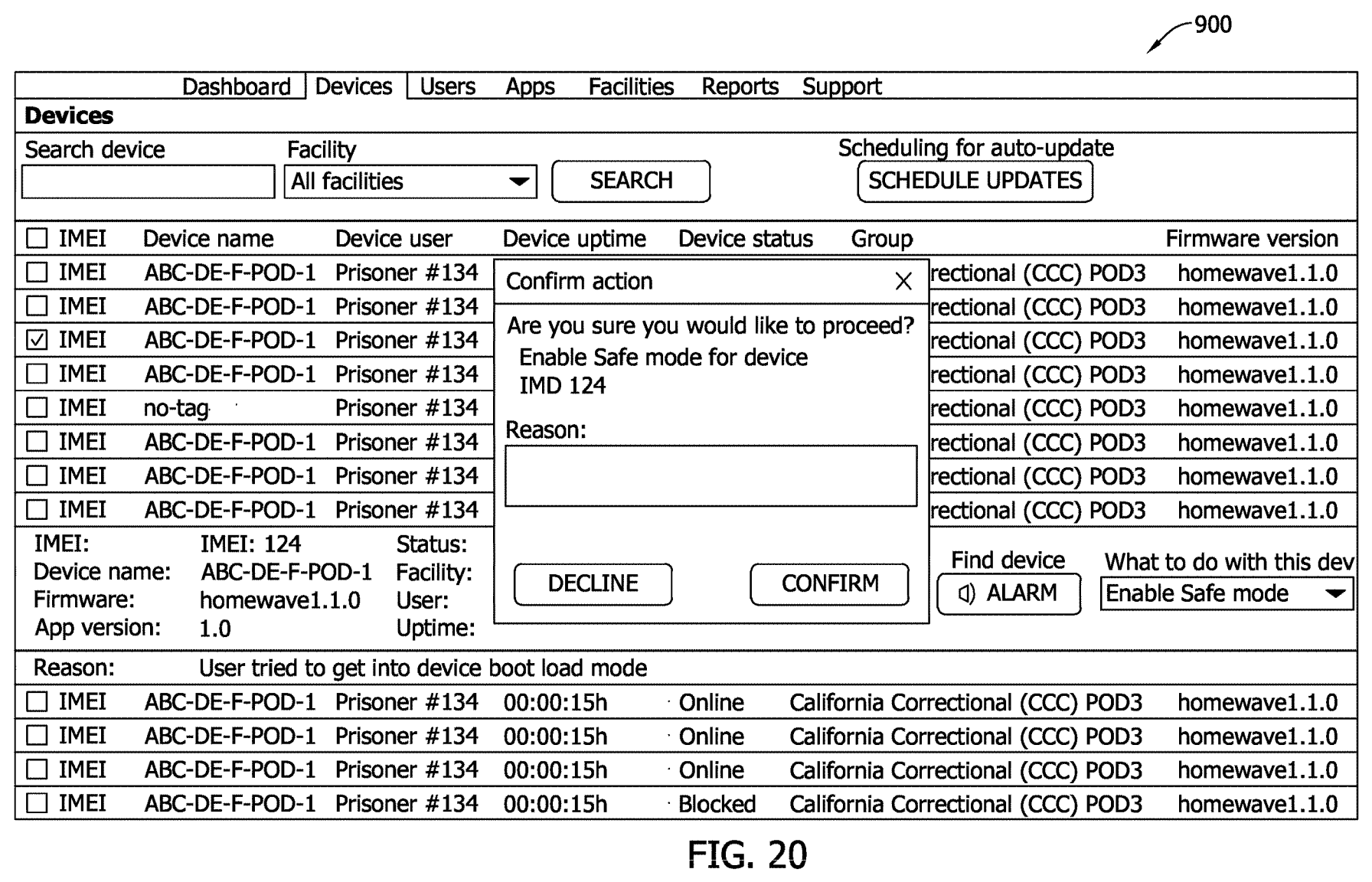

900

Devices

Dashboard | Devices | Users | Apps | Facilities | Reports | Support

Search device          Facility                                    Scheduling for auto-update
[          ]            [ All facilities ▶ ]   [ SEARCH ]          [ SCHEDULE UPDATES ]

| | Device name | Device user | Device uptime | Device status | Group | | Firmware version |
|---|---|---|---|---|---|---|---|
| ☐ IMEI | ABC-DE-F-POD-1 | Prisoner #134 | | | rectional (CCC) POD3 | | homewave1.1.0 |
| ☐ IMEI | ABC-DE-F-POD-1 | Prisoner #134 | | Confirm action | rectional (CCC) POD3 | × | homewave1.1.0 |
| ☑ IMEI | ABC-DE-F-POD-1 | Prisoner #134 | Are you sure you would like to proceed? | rectional (CCC) POD3 | | homewave1.1.0 |
| ☐ IMEI | ABC-DE-F-POD-1 | Prisoner #134 | Enable Safe mode for device | rectional (CCC) POD3 | | homewave1.1.0 |
| ☐ IMEI | no-tag | Prisoner #134 | IMD 124 | rectional (CCC) POD3 | | homewave1.1.0 |
| ☐ IMEI | ABC-DE-F-POD-1 | Prisoner #134 | Reason: | rectional (CCC) POD3 | | homewave1.1.0 |
| ☐ IMEI | ABC-DE-F-POD-1 | Prisoner #134 | [          ] | rectional (CCC) POD3 | | homewave1.1.0 |
| ☐ IMEI | ABC-DE-F-POD-1 | Prisoner #134 | | rectional (CCC) POD3 | | homewave1.1.0 |

IMEI:        IMEI: 124        Status:                Find device    What to do with this dev
Device name: ABC-DE-F-POD-1   Facility:   [ DECLINE ] [ CONFIRM ]  [ ◁) ALARM ]  [ Enable Safe mode ▼ ]
Firmware:    homewave1.1.0    User:
App version: 1.0              Uptime:

Reason:      User tried to get into device boot load mode

| | | | | | | |
|---|---|---|---|---|---|---|
| ☐ IMEI | ABC-DE-F-POD-1 | Prisoner #134 | 00:00:15h | · Online | California Correctional (CCC) POD3 | homewave1.1.0 |
| ☐ IMEI | ABC-DE-F-POD-1 | Prisoner #134 | 00:00:15h | · Online | California Correctional (CCC) POD3 | homewave1.1.0 |
| ☐ IMEI | ABC-DE-F-POD-1 | Prisoner #134 | 00:00:15h | · Online | California Correctional (CCC) POD3 | homewave1.1.0 |
| ☐ IMEI | ABC-DE-F-POD-1 | Prisoner #134 | 00:00:15h | · Blocked | California Correctional (CCC) POD3 | homewave1.1.0 |

Devices

Dashboard | Devices | Users | Apps | Facilities | Reports | Support

Search device | Facility | Scheduling for auto-update

[ ] | All facilities ▼

SEARCH | SCHEDULE UPDATES

| | Device name | Device user | Device uptime | Device status | Group | Firmware version |
|---|---|---|---|---|---|---|
| ☐ IMEI | ABC-DE-F-POD-1 | Prisoner #134 | | | rectional (CCC) POD3 | homewave1.1.0 |
| ☐ IMEI | ABC-DE-F-POD-1 | Prisoner #134 | | | rectional (CCC) POD3 | homewave1.1.0 |
| ☑ IMEI | ABC-DE-F-POD-1 | Prisoner #134 | | | rectional (CCC) POD3 | homewave1.1.0 |
| ☐ IMEI | ABC-DE-F-POD-1 | Prisoner #134 | | | rectional (CCC) POD3 | homewave1.1.0 |
| ☐ IMEI | no-tag | Prisoner #134 | | | rectional (CCC) POD3 | homewave1.1.0 |
| ☐ IMEI | ABC-DE-F-POD-1 | Prisoner #134 | | | rectional (CCC) POD3 | homewave1.1.0 |
| ☐ IMEI | ABC-DE-F-POD-1 | Prisoner #134 | | | rectional (CCC) POD3 | homewave1.1.0 |
| ☐ IMEI | ABC-DE-F-POD-1 | Prisoner #134 | | | rectional (CCC) POD3 | homewave1.1.0 |
| ☐ IMEI | ABC-DE-F-POD-1 | Prisoner #134 | | | rectional (CCC) POD3 | homewave1.1.0 |
| ☐ IMEI | ABC-DE-F-POD-1 | Prisoner #134 | | | rectional (CCC) POD3 | homewave1.1.0 |
| ☐ IMEI | ABC-DE-F-POD-1 | Prisoner #134 | | | rectional (CCC) POD3 | homewave1.1.0 |
| ☐ IMEI | ABC-DE-F-POD-1 | Prisoner #134 | 00:00:15h | Suspicious activity | California Correctional (CCC) POD3 | homewave1.1.0 |
| ☐ IMEI | ABC-DE-F-POD-1 | Prisoner #134 | 00:00:15h | Online | California Correctional (CCC) POD3 | homewave1.1.0 |
| ☐ IMEI | ABC-DE-F-POD-1 | Prisoner #134 | 00:00:15h | Online | California Correctional (CCC) POD3 | homewave1.1.0 |

Schedule updates ✕

Schedule update for

All devices ▼

Oldest installed version: homewav1.1.0

No updates required

☐ 11/11/2019 | 12:00PM ▼

CANCEL | DONE

FIG. 21

Figure 22:
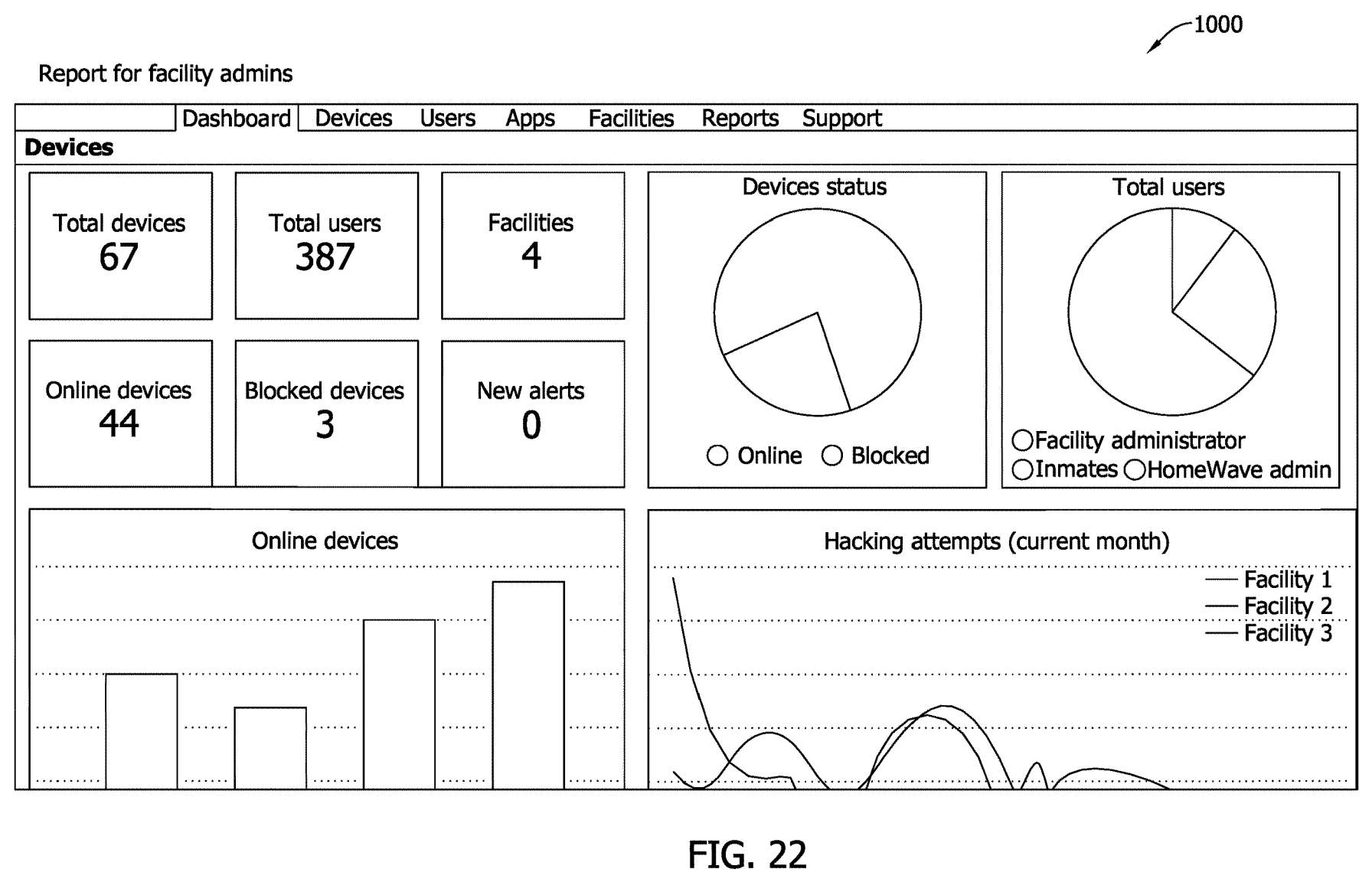

Report for facility admins

1000

Dashboard | Devices | Users | Apps | Facilities | Reports | Support

Devices

Total devices
67

Total users
387

Facilities
4

Online devices
44

Blocked devices
3

New alerts
0

Devices status

○ Online    ○ Blocked

Total users

○ Facility administrator
○ Inmates ○ HomeWave admin

Online devices

Hacking attempts (current month)

— Facility 1
— Facility 2
— Facility 3

Devices

Dashboard | Devices | Users | Apps | Facilities | Reports | Support

Search device          Facility                                          Scheduling for auto-update

[          ]  [ SEARCH ]   [ All facilities  ▸ ]                        [ SCHEDULE UPDATES ]

| | Device name | Device user | Device uptime | Device status | Group | Firmware version |
|---|---|---|---|---|---|---|
| ☐ IMEI | ABC-DE-F-POD-1 | Prisoner #134 | | | rectional (CCC) POD3 | homewave1.1.0 |
| ☐ IMEI | ABC-DE-F-POD-1 | Prisoner #134 | | Confirm action ✕ | rectional (CCC) POD3 | homewave1.1.0 |
| ☐ IMEI | ABC-DE-F-POD-1 | Prisoner #134 | | Are you sure you would like to proceed? | rectional (CCC) POD3 | homewave1.1.0 |
| ☑ IMEI | ABC-DE-F-POD-1 | Prisoner #134 | | Block the device: | rectional (CCC) POD3 | homewave1.1.0 |
| ☐ IMEI | no-tag | Prisoner #134 | | IMEI 134 | rectional (CCC) POD3 | homewave1.1.0 |
| ☐ IMEI | ABC-DE-F-POD-1 | Prisoner #134 | | Choose the reason: | rectional (CCC) POD3 | homewave1.1.0 |
| ☐ IMEI | ABC-DE-F-POD-1 | Prisoner #134 | | Other ▸ | rectional (CCC) POD3 | homewave1.1.0 |
| ☐ IMEI | ABC-DE-F-POD-1 | Prisoner #134 | | Hacking attempt | rectional (CCC) POD3 | homewave1.1.0 |

Suspicious activity

| IMEI: | IMEI: 124 | Status: | Lost device | Find device | What to do with this dev |
|---|---|---|---|---|---|
| Device name: | CCC tab-1 | Facility: | Other | ⟐ ALARM | [ Unlock the device ▸ ] |
| Firmware: | homewave1.1.0 | User: | | | |
| App version: | 1.0 | Uptime: | | | |

Reason:     User tried to get into device boot load mode

| | Device name | Device user | Device uptime | Device status | Group | Firmware version |
|---|---|---|---|---|---|---|
| ☐ IMEI | ABC-DE-F-POD-1 | Prisoner #134 | 00:00:15h | · Online | California Correctional (CCC) POD3 | homewave1.1.0 |
| ☐ IMEI | ABC-DE-F-POD-1 | Prisoner #134 | 00:00:15h | · Online | California Correctional (CCC) POD3 | homewave1.1.0 |
| ☐ IMEI | ABC-DE-F-POD-1 | Prisoner #134 | 00:00:15h | · Online | California Correctional (CCC) POD3 | homewave1.1.0 |
| ☐ IMEI | ABC-DE-F-POD-1 | Prisoner #134 | 00:00:15h | · Blocked | California Correctional (CCC) POD3 | homewave1.1.0 |

| Dashboard | Devices | Users | Apps | Facilities | Reports | Support |

Devices

| Search device | Facility | | Scheduling for auto-update | Choose an action for selected devices |
|---|---|---|---|---|
| [ ] | All facilities ▼ | SEARCH | SCHEDULE UPDATES | Block the device ▼ |

| | Device name | Device user | Device uptime | Device status | Group | Firmware version |
|---|---|---|---|---|---|---|
| ☐ IMEI | ABC-DE-F-POD-1 | Prisoner #134 | 00:00:15h | · Online | California Correctional (CCC) POD3 | homewave1.1.0 |
| ☐ IMEI | ABC-DE-F-POD-1 | Prisoner #134 | 00:00:15h | · Online | California Correctional (CCC) POD3 | homewave1.1.0 |
| ☑ IMEI | ABC-DE-F-POD-1 | Prisoner #134 | 00:00:15h | · Online | California Correctional (CCC) POD3 | homewave1.1.0 |
| ☐ IMEI | ABC-DE-F-POD-1 | Prisoner #134 | 00:00:15h | · Online | California Correctional (CCC) POD3 | homewave1.1.0 |
| ☐ IMEI | no-tag | · | | · Enabled | California Correctional (CCC) POD3 | homewave1.1.0 |
| ☐ IMEI | ABC-DE-F-POD-1 | Prisoner #134 | 00:00:15h | · Blocked | California Correctional (CCC) POD3 | homewave1.1.0 |
| ☐ IMEI | ABC-DE-F-POD-1 | Prisoner #134 | 00:00:15h | · Online | California Correctional (CCC) POD3 | homewave1.1.0 |
| ☐ IMEI | ABC-DE-F-POD-1 | Prisoner #134 | 00:00:15h | · Blocked | California Correctional (CCC) POD3 | homewave1.1.0 |

IMEI:  IMEI: 124  Status: · Blocked
Device name: ABC-DE-F-POD-1  Facility: CCC
Firmware: homewave1.1.0  User: Prisoner #134
App version: 1.0  Uptime: 00:00:15h

| Battery charge | Memory | Find device | What to do with this dev |
|---|---|---|---|
| 57% | 7 Gb/54Gb | ⚡ ALARM | Unlock the device ▼ |

Reason: User tried to get into device boot load mode

| ☐ IMEI | ABC-DE-F-POD-1 | Prisoner #134 | 00:00:15h | · Online | California Correctional (CCC) POD3 | homewave1.1.0 |
|---|---|---|---|---|---|---|
| ☐ IMEI | ABC-DE-F-POD-1 | Prisoner #134 | 00:00:15h | · Online | California Correctional (CCC) POD3 | homewave1.1.0 |
| ☐ IMEI | ABC-DE-F-POD-1 | Prisoner #134 | 00:00:15h | · Online | California Correctional (CCC) POD3 | homewave1.1.0 |
| ☐ IMEI | ABC-DE-F-POD-1 | Prisoner #134 | 00:00:15h | · Blocked | California Correctional (CCC) POD3 | homewave1.1.0 |

FIG. 26

CONFIGURABLE CORRECTIONAL FACILITY COMPUTER KIOSK SYSTEMS AND METHODS FOR PORTABLE ELECTRONIC DEVICE ACCESS AND MANAGEMENT

CROSS REFERENCE TO RELATED APPLICATIONS

This application claims the benefit of U.S. Provisional Application Ser. No. 62/990,113 filed Mar. 16, 2020, the complete disclosure of which is hereby incorporated by reference in its entirety.

BACKGROUND OF THE INVENTION

The field of the invention relates generally to computer kiosk systems specifically designed and configured to meet the security requirements of correctional facilities while reducing administrative burdens to correctional facility personnel, and more specifically to secure configurable computer kiosk systems automatically regulating inmate access to a selected number of portable electronic devices needed by a correctional facility via modular add-on device charging bays while automatically accounting for inmate use of the portable electronic devices and while intelligently managing battery charging of the portable electronic devices when not in use.

Various types of customized computer systems exist to meet the unique needs of correctional facilities. Such customized computer systems aim to ease administrative burdens to correctional facility personnel who oversee the facilities, and allow inmates to conveniently but securely exercise privileges made available to them in correctional facilities. For example, HomeWAV, LLC (www.homewav-.com) has developed a custom video visitation system that is specifically configured to allow spontaneous electronic audio/video visitation sessions between online pre-registered inmates in a correctional facility and pre-registered remotely located visitors via respective computer devices accessible to inmates and computer devices of approved, registered visitors which are interfaced to the inmate computer devices through hosted services of the HomeWAV® video visitation system.

The HomeWAV® video visitation system is implemented in wall-mounted computer kiosks and/or mobile computer devices such as tablet computer devices that are made available for use by inmates in a correctional facility, with the wall-mounted kiosks or tablet computer devices being configured to communicate exclusively with the Home-WAV® video visitation system in a secure manner. Visitors may use computer kiosk devices located in a correctional facility which are interfaced through the HomeWAV® video visitation system to an inmate device, or may use a computer device of their own choosing, including but not limited to smartphones and tablet computers, at a remote location from the correctional facility to conduct off-site visitation sessions with inmate(s) that are established remotely via Home-WAV® system. Video visitation sessions may be conveniently conducted with desired inmates in the same or different correctional facility via the respective devices used by the inmates inside the respective correctional facilities and the visitor device(s) of registered visitors.

The HomeWAV® video visitation system dramatically reduces, if not eliminates, burdens on correctional facility personnel in aspects of otherwise conventionally required logistical scheduling and/or manual approval of visitation requests, while nonetheless providing adequate security safeguards and oversight capabilities needed by correctional facility personnel. Numerous benefits of frequent visitation sessions with incarcerated inmates are beneficially realized via the HomeWAV® system at relatively low cost, and sometimes at no cost, to correctional facilities. Further, video visitation services are only one of many services made available to inmates via the HomeWAV® system to authorized inmates having current privilege status allowing them to access the system.

While the HomeWAV® video visitation system has been well received in the marketplace and has been awarded numerous patents to date, further technological improvements are nonetheless desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

FIG. 20 illustrates a first exemplary administrative user interface graphical screen display for monitoring of the portable electronic device assemblies of FIGS. 2, 15 and 16 that are utilized with the kiosk systems of FIGS. 1-3, 5 and 14.

FIG. 21 illustrates an exemplary administrative user interface graphical screen display for software scheduling update of the portable electronic device assemblies of FIGS. 2, 15 and 16 that are utilized with the kiosk systems of FIGS. 1-3, 5 and 14.

FIG. 22 illustrates an exemplary administrative user interface graphical screen display for correctional facility administrator review of the portable electronic device assemblies of FIGS. 2, 15 and 16 that are utilized with the kiosk systems of FIGS. 1-3, 5 and 14.

FIG. 23 illustrates an exemplary administrative user interface graphical screen display for review of malicious activity for the portable electronic device assemblies of FIGS. 2, 15 and 16 that are utilized with the kiosk systems of FIGS. 1-3, 5 and 14.

FIG. 24 illustrates an exemplary administrative user interface graphical screen display for enrollment of users for the kiosk systems of FIGS. 1-3, 5 and 14.

FIG. 26 illustrates an exemplary administrative user interface device graphical screen display of portable electronic device status for the electronic device assemblies of FIGS. 2, 15 and 16 that are utilized with the kiosk systems of FIGS. 1-3, 5 and 14.

DETAILED DESCRIPTION OF THE INVENTION

Figure 1:
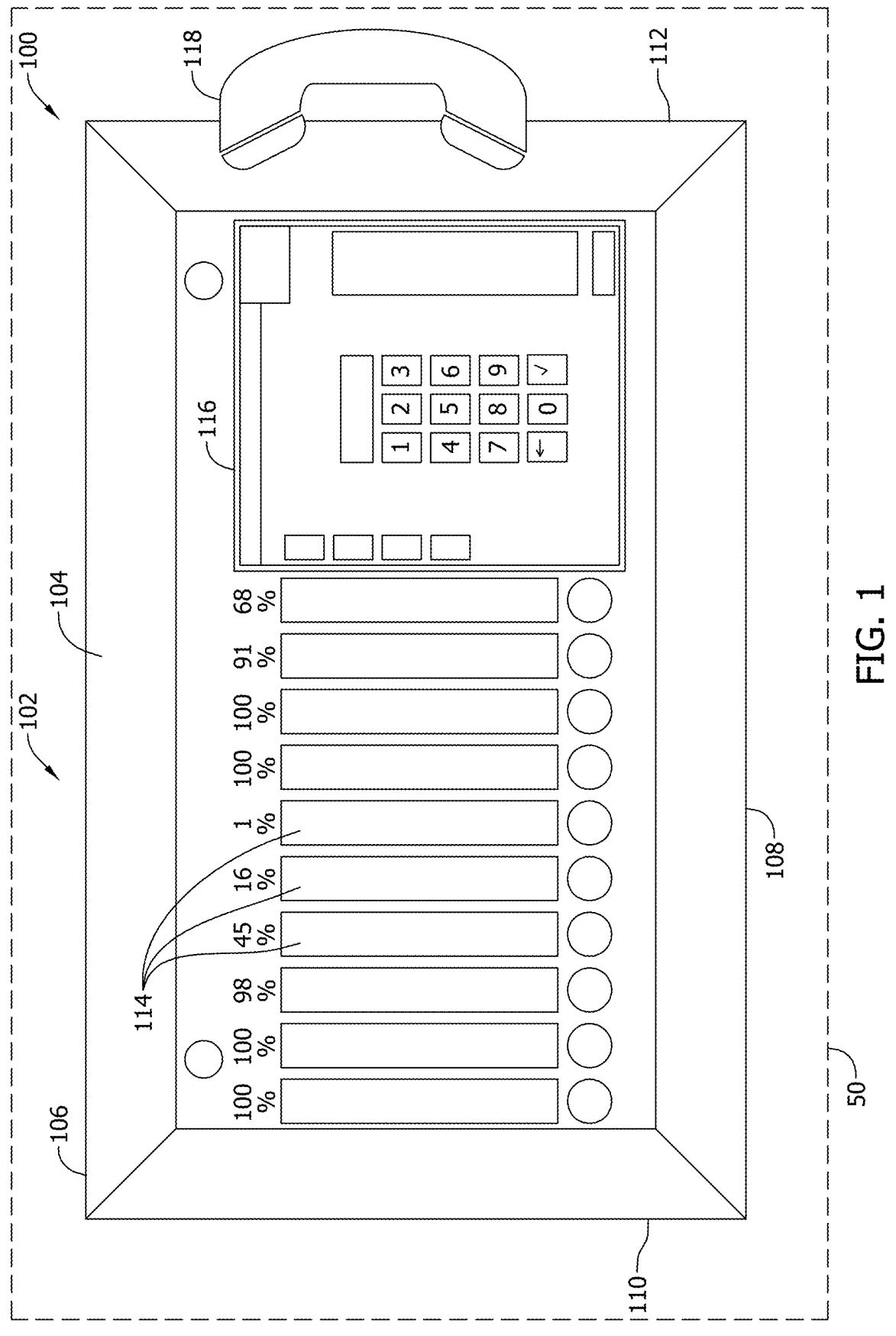
FIG. 1 is a front view of a first exemplary embodiment of a configurable correctional facility computer kiosk system featuring secure, multi-inmate device access restriction and check-out tracking capability with intelligent multi-inmate device charging management capability according to an exemplary embodiment of the present invention.

The inventive concepts described herein beneficially address particular issues presented by an adoption of computer systems accessible by inmates in correctional facilities via portable electronic devices such as tablet computer devices. Accordingly the following discussion of the state of the art and particular problems presented by the use of portable computer devices in particular environments is appropriately presented for a better understanding of particular problems that now exist in the art, followed by exemplary embodiments of the invention that overcome such problems The modern day proliferation of mobile computer technology and handheld computing devices has conventionally been avoided in correctional facility computer systems for a variety of reasons that are presently receding rapidly in view of technological advances. An availability of relatively powerful tablet computer devices at relatively low cost, coupled with the convenience that they provide, makes them an attractive option to conventional, non-mobile computer terminal devices now in use at correctional facilities for visitation purposes and other desirable applications that inmates may access when permitted by facility administrators. For instance, the patented HomeWAV® video visitation system (see U.S. Pat. Nos. 10,313,632; 9,800,830; 9,124,763; and 9,094,569) contemplates, in addition to conventional wall-mounted computer kiosk terminals and the like, mobile computing devices such as tablet computer devices for use by inmates to conduct online visitation sessions and other featured services made available to inmates. Certain challenges and limitations are presented on the correctional facility side, however, that effectively present barriers to adoption of portable, handheld or mobile devices such as tablet computer devices for use by inmates in correctional facilities.

In one aspect, and especially for correctional facilities housing large populations of inmates, keeping track of relatively large numbers of tablet computer devices needed to accommodate the large inmate population presents administrative and logistical challenges to correctional facility administrators. Specifically, and as a rule of thumb, in a system such as the HomeWAV® video visitation system the ratio of tablet computers to inmates should preferably be about 1:5 to ensure that a sufficient number of tablet computer devices are available to inmates when needed. As such, for a correctional facility housing 100 inmates, about 20 tablet computer devices would be optimal to serve the inmate population. Effective and efficient check-in, check-out, and device tracking procedures are needed, however, for security and safety reasons for inmate use of the tablet computer devices, but as its stands the burdens of doing so undesirably fall largely on correctional facility administrators to implement and execute. Electronic tools assisting correctional facility administrators to ensure secure access to specific tablet computers by specific inmates, restrict access to specific tablet computers by specific inmates, and to track, log, and record the time of use and nature of use of specific tablet computers on an inmate-by-inmate basis in a reliable manner are desired.

Of course, such burdens and logistical issues of tracking an inventory of tablet computer devices inmate-by-inmate and device-by-device multiply as the size of the inmate population increases in a correctional facility. Numerous correctional facilities exist today having populations of more than a thousand inmates, and some correctional facilities exist today having populations of more than ten thousand inmates. Considering also the sheer number of correctional facilities today, and the various different types of correctional facilities (e.g., state prisons, federal prisons, local jails, juvenile correctional facilities, Native American detention facilities, and military detention facilities) the industry challenges to widespread adoption of tablet computer devices for use by inmates in a secure manner are simply enormous.

In another aspect, charging and re-charging of battery powered tablet computer devices as needed across an inventory of tablet computer devices presents additional challenges that also tend to impose burdens on correctional facilities and correctional facility administrators. Charging and re-charging of numerous tablet computer devices one-by-one using a limited number of electrical outlets is possible but in most cases impractical. Manual inspection of tablet computer devices one-by-one to assess the state of charge of the battery in each device to determine whether they should be connected or disconnected from a charging power supply is likewise possible but in most instances undesirable and impractical. Power strips and power distribution units are available having a plurality of electrical receptacles that may facilitate simultaneous charging of a number of tablet computer devices in a common location, but at some expense to the correctional facilities, and custom modifications to existing electrical systems in existing correctional facilities to accommodate tablet device charging needs is generally cost prohibitive.

Custom-fabricated tablet inventory management and charging systems are possible to uniquely meet the needs of specific correctional facilities to manage and charge a specific number of tablet devices as determined by the correctional facility in advance. Correctional facilities would in most cases rather avoid the expense, however, of purchasing custom-fabricated tablet inventory management and charging systems, and face practical dilemmas of having expensive, custom fabricated systems that are under-utilized (i.e., can accommodate more tablet devices than the correctional facility actually needs or uses) or are insufficient to meet the number of tablet devices desired or required and cannot be cost effectively modified for expansion.

Changes in the inmate population over time in any correctional facility introduce further logistical challenges to tablet inventory management concerns across a population of inmates. Particularly with respect to privileges that may be granted and suspended to inmates individually or as a group in view of behavioral considerations or security concerns of the correctional facility overall, the current privilege status of each inmate should be taken into consideration each time an inmate seeks to access a tablet computer device. Reliably applying privileges and restrictions to privileges in real time, however, is difficult, rendering it possible for an inmate to access a tablet computer device when the inmate's privilege to access the device has actually been revoked or suspended at the time that access was granted. Reliable electronic tools to assist in the timely application of changes in privilege status and restrictions are accordingly desirable.

In still further aspects, changes in the number of tablet devices needed in a given correctional facility, as well as changes in the physical package size and form factor of tablet computers can render custom fabricated check-in, check-out and tablet charging kiosk systems obsolete rather quickly. For instance, a smaller correctional facility today that only needs a smaller and conventionally manageable number of tablet devices may quickly grow into the challenges discussed above concerning tracking and charging/re-charging of a larger inventory of tablet computer devices that is not as manageable, or that may become unmanageable. In other words, a facility may outgrow a custom-fabricated hardware/software solution. As newer tablet devices are acquired having different form factors and sizes than existing ones in a correctional facility, they may or may not be compatible with any existing equipment or custom fabricated hardware/software solution adopted by correctional facilities to store and charge the tablet computer devices when not in use, imposing additional costs and burdens to correctional facility administrators.

Outside the correctional facility market such as in library environments or other public environments, kiosk systems have been developed to manage charging and access to portable devices such as tablet computers that are generally incompatible with correctional facility needs due to their lack of security features and safeguards. Some attempt has also been made to develop correctional facility systems that address some of the issues above with systems level device check-out access restriction and automated dispensing of portable computing devices with some security features needed by the correctional facility market, but known correctional facility solutions of this type tend to be overly complicated, bulky, expensive, and inflexible to meet the needs of a variety of different correctional facilities having different inmate population sizes. Simpler, smaller, flexible, and lower cost correctional facility hardware/software solutions are desired to more effectively meet the needs of correctional facilities requiring secure, controlled access to portable computing devices.

Exemplary embodiments of correctional facility computer kiosk devices, systems and methods are described below that overcome the problems discussed above by providing configurable hardware and software solutions that beneficially automate tablet computer device charging and inmate check-in/check-out procedures with appropriate device intelligence and oversight capability by correctional facility administrators while otherwise presenting minimal burdens on correctional facility administrators. Such configurable correctional facility computer kiosk devices provide much flexibility, without incurring costs of custom-fabricated systems on a per-facility basis, to provide optimally sized systems for various different correctional facilities, with capability to expand or modify the correctional facility computer kiosk device to meet the changing needs of facilities over time.

More specifically, in contemplated embodiments an inventive correctional facility computer kiosk device is configurable in modular form to provide an intelligent multi-device charging station kiosk having a desired number of tablet charging slots and locking/unlocking features to ensure that tablet computer devices can only be obtained by identified and pre-authorized inmates having privilege status to access one of the tablet devices. Apart from checking-in, checking-out and charging the tablet computer devices, the computer kiosk device is multi-functional to complete tasks that do not require a tablet computer device to accomplish.

While described in the context of correctional facilities such as jails and prisons, and also while described specifically in the context of the patented HomeWAV® video visitation services, the inventive concepts described herein are not necessarily limited to correctional facilities such as jails or prisons, and further are not necessarily limited to video visitation system services. Rather, the inventive concepts described herein may more generally accrue to a broad variety of facilities that present similar issues concerning desirable controlled access and secure device management and tracking of tablet devices and/or to facilities and environments in which the benefits of the inventive concepts described equally apply in whole or in part to manage access to and charging of a plurality of mobile devices. Some of the features described, including modular charging assemblies accommodating different numbers of devices, may be desirable for general commercial or residential use as well to manage a plurality of mobile computer devices. Method aspects will be in part explicit and in part apparent in the description below.

Referring now to the drawings, FIG. 1 is a front view of a configurable correctional facility computer kiosk system 100 featuring secure, multi-inmate device access and tracking capability and intelligent multi-inmate device charging management capability according to an exemplary embodiment of the present invention. The computer kiosk system 100 includes a rugged housing, casing or cabinet 102 that may be securely mounted to a support structure 50 such as a wall in a correctional facility using known fasteners, anchors, or techniques to fixedly mount the kiosk system 100 in a desired location. Alternatively, instead of mounting to a vertically-oriented support such as a wall, the kiosk system 100 could be mounted instead to a horizontally-oriented support structure such as a tabletop, desktop, countertop, floor or other support structure as desired. In some cases, the kiosk system 100 could likewise be obliquely mounted to a support and therefore be presented to a user at any angle desired relative to vertical or horizontal planes in a correctional facility.

Likewise, in other contemplated embodiments the kiosk system 100 may also be provided in a freestanding or self-supporting cabinet or housing to be placed on a tabletop, desktop, countertop, floor, or shelf as desired, whether or not actually being secured in place. Portable and non-portable embodiments of the kiosk system 100 are therefore contemplated. In some cases, the kiosk system 100 is provided in relatively small and lightweight package sizes that can be carried by hand, while in other embodiments larger and heavier kiosk systems may incorporate wheels or casters provided on one or more freestanding or self-supporting cabinets, housings or carts allowing the system to be easily moved from place to place or positioned and re-positioned in a desired location as needed.

In a contemplated embodiment, the cabinet housing 102 of the computer kiosk system 100 may be constructed from heavy duty materials such as steel and may include structural assembly and fabrication techniques to provide a so-called "jail-hardened" device meeting applicable and specific requirements of correctional facility installation to ensure that the kiosk system 100 cannot be tampered with and therefore meet security needs in a controlled environment. The cabinet housing 102 in the example shown includes a generally flat and planar, rectangular front face 104 and sloping side edges 106, 108, 110 and 112 surrounding the front face 104 at an angle thereto and therefore sloping away from the front face 104 and into the plane of FIG. 1 in the example shown. The side edges 106 and 108 are considerably longer in dimension than the side edges 110, 112 such that the cabinet housing 102 has an elongated horizontal dimension in the plane of FIG. 1 in the illustrated example. Other geometric shapes and configurations of the cabinet housing 102 are, of course, possible in alternative embodiments.

The front face 104 of the cabinet housing 102 defines a number n of tablet computer slots 114 that extend perpendicularly to the front face 104 (i.e., extend normal to the plane of FIG. 1). Each tablet computer slot 114 is sized and dimensioned to respectively receive a single tablet computer 200 (FIGS. 2a and 2b), and the tablet computer slots 114 are arranged side-by-side in a generally vertical orientation (i.e., perpendicular to the long side edges 106, 108) as shown. In contemplated embodiments, the cabinet housing 102 is relatively shallow such that the tablet computer slots 114 extend into a recess in the support 50. As such, the cabinet housing 102 may protrude only a small distance from the surface of the support 50 while the remainder of the hardware is recessed inside the support 50. In such embodiments, the kiosk system 100 is compact in use, and is desirably unobtrusive when installed.

A flat, touch screen monitor 116 is likewise mounted to the front face 104 at one end of the front face 104 of the cabinet housing 102 for use by a user such as an inmate, and a telephone handset 118 is also provided and connected to the cabinet housing 102 for use by an inmate user. In some cases, the telephone handset 118 may be considered optional and need not be provided, and input elements other than a touch screen element 116 (e.g., keypads or a keyboard) may be provided to accept user inputs.

Figure 3:
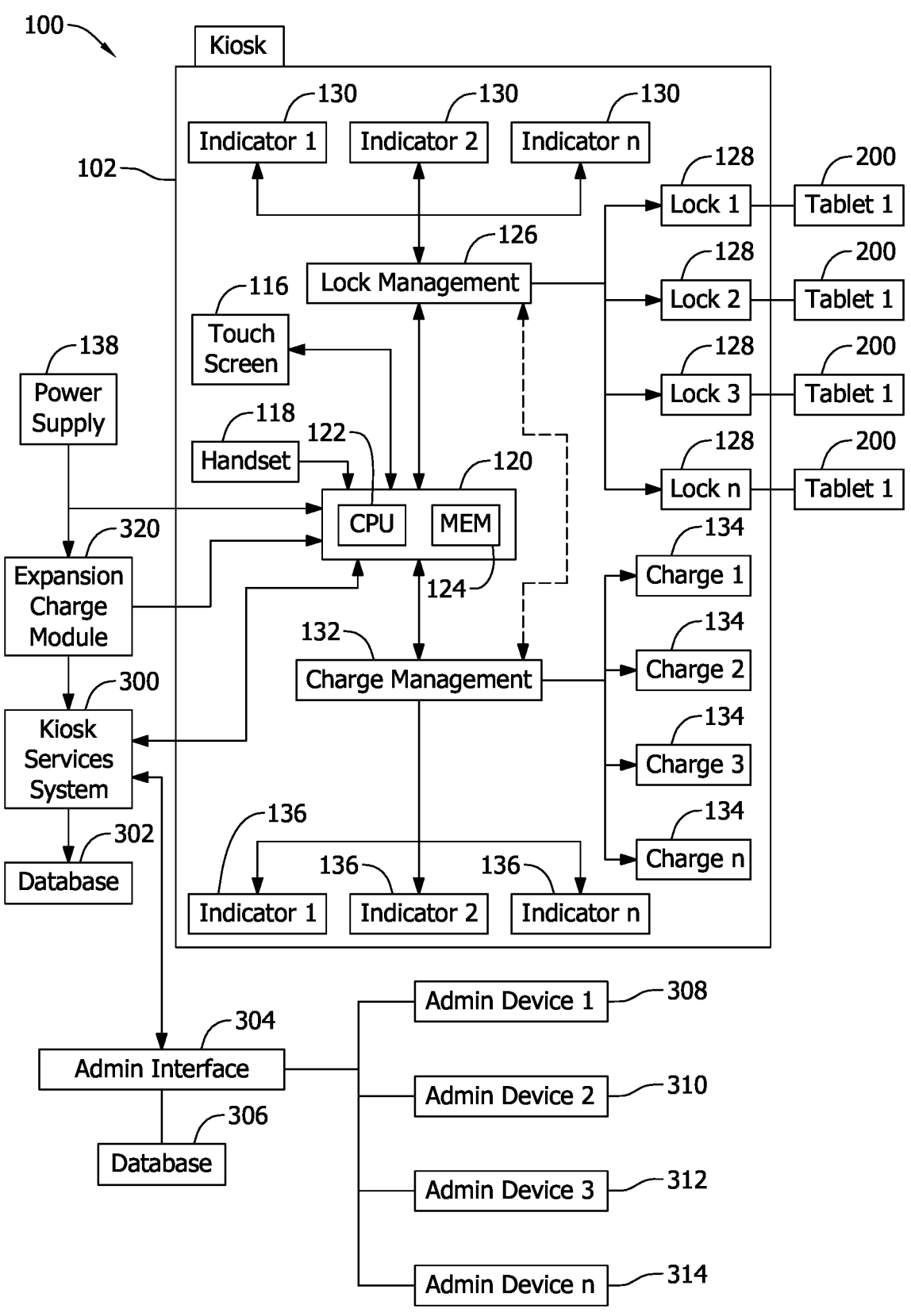
FIG. 3 is a block diagram of a correctional facility system including the configurable kiosk system shown in FIG. 1.

Internal to the cabinet housing 102, and as further shown in FIG. 3, the kiosk computer system 100 includes a controller 120 including a processor 122 and a memory storage 124 wherein executable instructions, commands, and control algorithms, as well as other data and information required to satisfactorily operate the kiosk system 100 as described herein are stored. The memory 124 of the processor-based controller may be, for example, a random access memory (RAM), and other forms of memory used in conjunction with RAM memory, including but not limited to flash memory (FLASH), programmable read only memory (PROM), and electronically erasable programmable read only memory (EEPROM) may likewise be included.

Via the touchscreen monitor 116, an inmate user may login to the computer kiosk system 100 as a pre-registered inmate user in order to use services offered via the computer kiosk system 100. Such services may include audio/video visitation services, email services, web browsing or web content services, phone call services, appointment or scheduling services, financial account services, educational services, commissary services, or other services offered to inmates as revocable privileges across an inmate population in a correctional facility. Such inmate privileges are revocable in the sense that they may be granted, revoked or suspended for a definite period of time or an indefinite period of time in view of inmate status and behavioral considerations over time. As such, the same inmate user over a period have time may have privileges (or may not have privileges) to access some or all of the features available via the computer kiosk system 100. Likewise, the same inmate user may over a period of time be subject to more or less limitation or restriction on certain types of privileges due to inmate status and behavioral considerations.

Accordingly, the computer kiosk system 100 accepts unique login information from an inmate via the touch screen monitor 116 and/or the telephone handset 118 so that each inmate accessing the kiosk computer system 100 can be uniquely identified and privilege status of the inmate as identified can be verified or confirmed on demand at each time of access by respective inmate users. Aside from username and password/PIN number log-in, the computer kiosk system 100 may include and incorporate biometric identification hardware and software elements to perform fingerprint analysis/comparison, voice analysis/comparisons, facial recognition, retinal scan/comparison, etc. to achieve varying additional degrees of security and/or user convenience.

In contemplated embodiments, video-based voice biometric identifications are employed as an added security feature for video visitation sessions or alternative purposes as desired. In such video-based voice biometric identification, the audio is extracted from the video feed and is analyzed to identify the person(s) participating in the video conference.

Alarms or alerts can be generated if unauthorized persons are detected in a video visitation session.

Figure 2A:
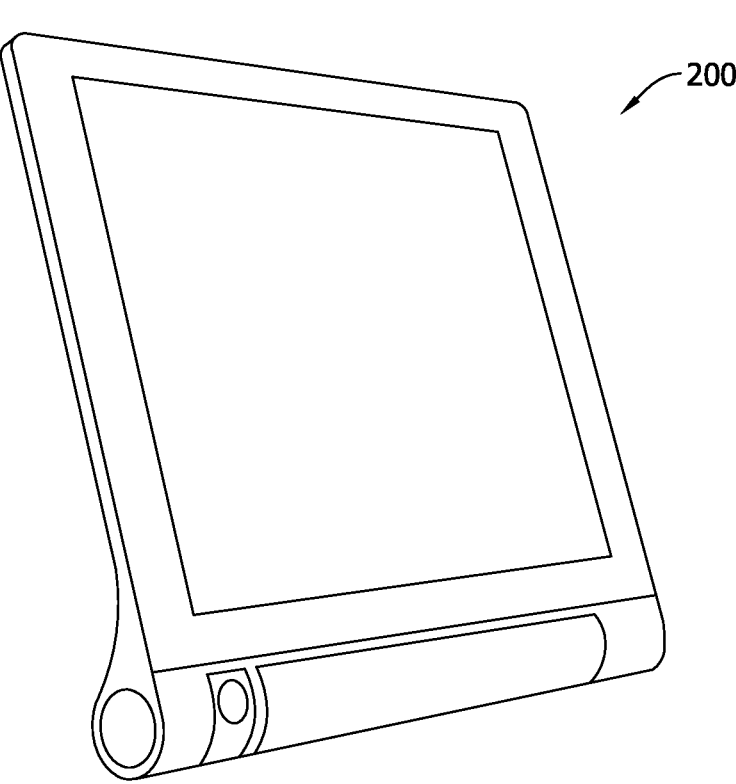
FIGS. 2a and 2b are respective front and rear perspective views of an exemplary portable electronic device for use with the configurable correctional facility computer kiosk system shown in FIG. 1 according to an exemplary embodiment of the present invention.
Figure 2B:
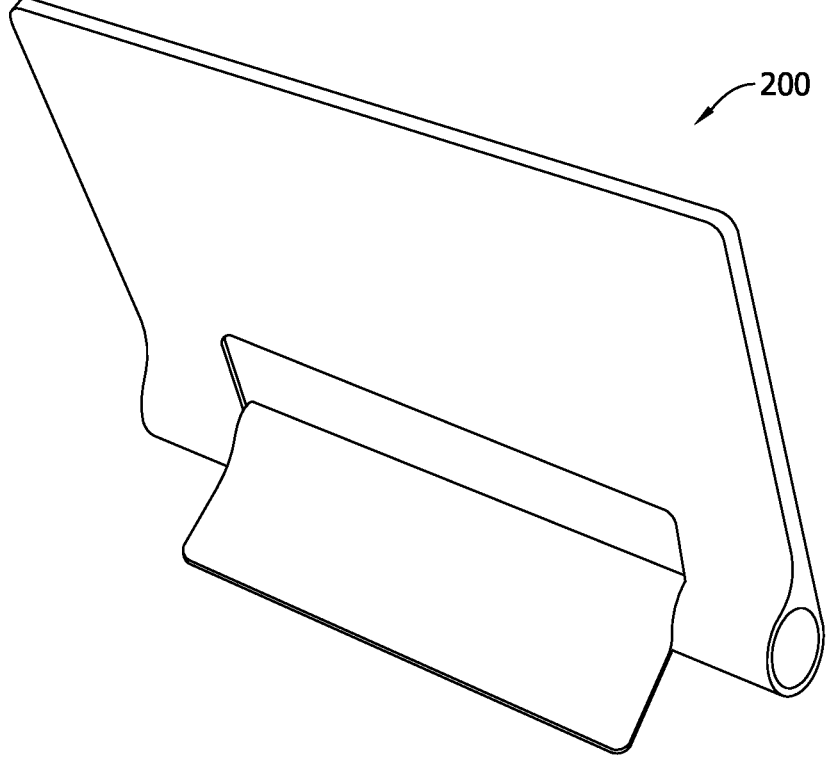

The touchscreen monitor 116 and the telephone handset 118 may be utilized by an inmate user as desired to complete activities that do not require a tablet computer device 200 to accomplish. When a tablet computer device 200 is desired, however, the kiosk computer system 100 can be utilized to automate a check-in, check-out process and ensure that a plurality of tablet computer devices 200 are adequately charged for use and re-charged in periods of non-use. Accordingly, the plurality of the tablet computer slots or openings 114 (e.g., ten slots as shown in FIG. 1) are arranged side-by-side on the front face 104 of the kiosk cabinet housing 102, with each slot 114 dimensioned to receive a single tablet computer device 200 (FIGS. 2a and 2b).

When a tablet computer device 200 is received in one of the slots 114, the tablet computer device 200 may be locked in place by a locking mechanism (not shown in FIG. 1) internal to the kiosk cabinet housing 102 and operative with respect to each slot 114. In contemplated embodiments, the end of each tablet computing device may protrude from the slot 114 when received and locked in place such that the tablet computing device is only partially received in the slot 114, further reducing the overall size of the kiosk system 100 relative to a system that receives or contain an entirety of a tablet device with little or no protrusion of the tablet computing device. The locking mechanism may include an electromagnetic lock actuator, operable by the kiosk controller 120 (FIG. 3) including an extendable or retractable lock element such as a pin that physically engages a slot or opening formed in the tablet computer device 200, although lock elements other than pins may be employed with similar effect to positively engage the tablet computer device 200 and prevent its removal from the kiosk system. An inserted tablet computer device 120 may therefore be directly engaged and locked to the slot 114 in which it has been inserted, preventing removal from the kiosk computer system 100 until the locking mechanism is operated by the controller 120 to unlock it. Additionally, in contemplated embodiments the tablet computer devices 200 may be supplied with protective cases that are compatible with the kiosk computer system 100, and locking inserts may be provided in the protective case that likewise prevent an unauthorized removal of the case and the included tablet computer device from the kiosk computer system 100.

Once the tablet computer device 200 is received and locked in place in one of the slots 114 in the computer kiosk system 100, the tablet computer device 200 may be charged wirelessly in a contemplated embodiment via inductor circuitry provided in the kiosk system. In the example shown in FIG. 1, ten slots 114 are provided and therefore ten tablet computer devices 200 can be simultaneously locked in place in the respective slots 114 and charged at once. In contemplated embodiments, the respective tablet computer devices 200 in each respective slot 114 are individually lockable or unlockable via lock management hardware/software 126 (FIG. 3) operating the locks 128 (shown in FIG. 3 as lock 1 through lock n) although variations are possible in this regard. Indicators 130 (shown in FIG. 3 as indicators 1 through n) may be provided to indicate the status of each lock in any manner desired.

In the example shown, battery charge management hardware/software 132 (FIG. 3) may also be provided in the kiosk housing cabinet 102 and may also be associated with slots 114 to selectively operate charging sensors and/or charging circuitry 134 (indicated in FIG. 3 as charge 1 through n). Charging indicators 136 (indicated in FIG. 3 as indicators 1 through n) may be provided to visually indicate the state of charge in each of the tablet computer devices 200. The charging circuitry 134 includes any AC/DC or voltage/current conversion circuitry required to convert electrical power from a main power supply 138 to charge the tablet devices 200 in the slots 114 provided.

Referring back to FIG. 1, indicators may be provided on front face 104 of the kiosk system 100 below the slots 114 (or above the slots or in another location as desired) to assist an inmate user during check-out or check-in of a tablet computer device 200. For instance, in a contemplated embodiment the indicators may be light emitting diodes (LEDs) that may illuminated in one or more colors. When an inmate logs in to the computer kiosk system 100 and is confirmed to be authorized and to have active privileges to access a tablet computer device 200, one or more of the indicators may be lit in a desired color (e.g., green) to indicate to the inmate that he or she may remove the associated tablet device from the kiosk, while one or more of the other indicators may be lit in another color (e.g., red) to indicate to the inmate that he or she may not remove the associated tablet computer device 200 for use. Of course, illumination elements other than LEDs may likewise be utilized, and when such illumination elements are not operable in different colors, more than one illumination element may be provided with respect to each slot to indicate a similar type of red/green stop/start feedback to a user. Multi-color indicators are not required in all embodiments, however, and single color user feedback may be provided as desired in other embodiments. Also, in some cases the indicators themselves may be considered and need not be provided.

The slots 114 in further embodiments may be marked or identified by name or number that corresponds to one of the tablet computer devices 200. As such, an identity of an unlocked table device 200 may be communicated to an inmate user via a message on the touch screen monitor 116 (e.g., "Retrieve Device 7") and/or via voice message through the handset 118 or a separately provided speaker. Combinations of audio and video communication are possible to direct the user to access the correct table computer device from the number of tablet computer devices that are present in the respective slots 114.

The locking mechanism(s) for each device 200 may be automatically operated by the kiosk controller 120 to unlock one or more of the tablet computer devices 200 for removal from the computer kiosk system 100. In some contemplated embodiments, a tablet computer device 200 may further be automatically ejected from a slot 114 once unlocked via spring loaded mechanisms provided in the slot 114, such that the inmate user will see the tablet computer device 200 being released and intuitively know or realize that it has been made available for use. In other contemplated embodiments, the inmate user may manually unlock one of the tablet devices 200 via a pushbutton or by other action which may be explained or illustrated (i.e., graphically depicted or animated) to the inmate on the touch screen monitor 116 for reference by the inmate user to retrieve a tablet computer device 200 by following the directions and visual cues provided.

In contemplated embodiments, the computer kiosk system 100 is configurable to include different numbers of slots 114 in modular form via modular component assemblies that can be added to or subtracted from the kiosk system 100 to flexibly meet the needs of different correctional facilities that require different numbers of tablet computer devices 200. For example, the computer kiosk system 100 illustrated in FIG. 1 could be fabricated in two component sub-assemblies, namely a first sub-assembly including the touch screen monitor 116 and a predetermined number of tablet computer slots 114 (e.g., five slots) and a second sub-assembly including five additional tablet computer slots 114 to provide a total of ten tablet computer slots 114 in the completed computer kiosk system 100 as shown. In the context of the present disclosure the first sub-assembly is referred to as a main kiosk sub-assembly and the second sub-assembly is an add-on sub-assembly including additional tablet computer slots 114 wherein the tablet computer devices 200 may be lockably received and charged when not in use. Such an add-on sub-assembly including additional tablet computer slots 114 is sometimes referred to herein as a modular charging bay.

The first and second sub-assemblies may be provided in modular, plug and play form that can be easily coupled together mechanically and electrically in a daisy chain arrangement or another arrangement including compatible mechanical and electrical connectors. When desired, a third component sub-assembly could be provided that, similar to the second sub-assembly described above, includes five additional tablet computer slots 114 so that the kiosk can easily be configured to have fifteen slots 114 instead of ten. Any number n of modular sub-assemblies can be mixed and matched with a main kiosk assembly to provide the optimal number of charging slots 114 in the assembled computer kiosk system 100 in an optimal manner for any given correctional facility. The number n of modular sub-assemblies can be increased or decreased over time to accommodate changing needs and circumstances of correctional facilities over time. In some cases, the main kiosk assembly need not itself include any charging slots at all so long as the desired number of charging slots 114 are provided in an add-on modular sub-assembly or in a combination of add-on modular sub-assemblies.

In another embodiment, modular component sub-assemblies can likewise be provided having the same or different numbers of tablet computer slots 114 to obtain a finer gradation of the resultant number of tablet computer slots 114 in the computer kiosk system 100 when the sub-assemblies are connected. For example, the computer kiosk system 100 illustrated in FIG. 1 could be fabricated in three sub-assemblies, namely a first or main sub-assembly including the touch screen monitor 116 and a predetermined number of tablet computer slots 114 (e.g., two slots), a second add-on sub-assembly including four additional tablet computer slots 114, and a third add-on sub-assembly including four additional tablet computer slots 114 to provide a total of ten tablet computer slots 114 as shown in the completed system 100. Still another component sub-assembly could be provided having ten additional tablet computer slots 114, and when added to the three sub-assemblies described above a total of twenty tablet computer slots 114 would be provided in the completed computer kiosk system 100.

Likewise, the computer kiosk system 100 illustrated in FIG. 1 could be fabricated in three component sub-assemblies, namely a first main sub-assembly including the touch screen monitor 116 and a predetermined number of tablet computer slots 114 (e.g., two slots), a second sub-assembly including three additional tablet computer slots 114, and a third sub-assembly including five additional tablet computer slots 114 to provide a total of ten tablet computer slots 114 as shown. By providing different numbers of modular sub-assemblies having respectively different numbers of table computer slots 114, widely varying numbers of tablet computer slots 114 can be provided without entailing custom fabrication of kiosk systems including the desired number of slots at greater expense.

As still another example, modular component sub-assemblies having equal numbers of tablet computer slots 114 could be provided for assembly to incrementally expand the number of tablet computer slots by the same amount. As such, any number of n component subassemblies could be assembled to scale the desired number of tablet computer slots 114 to the number desired. For example, a first main sub-assembly including the touch screen monitor 116 and a predetermined number of tablet computer slots 114 (e.g., two slots), a second sub-assembly including two additional tablet computer slots 114, and a third sub-assembly including two additional tablet computer slots 114 could be provided and assembled to result in a total of six tablet computer slots 114 in the completed kiosk system. Likewise, a first main sub-assembly including the touch screen monitor 116 and a predetermined number of tablet computer slots 114 (e.g., two slots), and five sub-assemblies including two additional tablet computer slots 114 apiece could be provided and assembled to result in a total of twelve tablet computer slots 114 in the completed computer kiosk system 100 as in the example shown. Also, additional expansion sub-assembly modules could be provided each having a desired number of slots (e.g., two slots), such that a computer kiosk system including six slots 114 could easily be extended to eight or ten table computer slots 114, and such that a computer kiosk system including twelve tablet computer slots 114 could easily be extended to fourteen or sixteen tablet computer slots 114. Such expandable computer kiosk systems, via such expansion modules, are scalable to include practically any desired number of tablet computer slots 114 at the time of installation or at a subsequent time to beneficially retrofit an existing computer kiosk system to include additional tablet computer slots 114 in a low cost manner.

By providing different modular component assemblies having the same or respectively different numbers of tablet computer slots 114, widely varying numbers of tablet computer slots 114 can be provided to flexibly meet the needs of different correctional facilities without entailing custom fabrication of kiosks including a specifically desired number of tablet computer slots on a per-facility basis at otherwise greater expense. The number of tablet computer slots 114 in each modular sub-assembly may be greater or fewer than the examples described above and may also be even or odd numbers. Additionally, a modular sub-assembly could be provided that includes a single slot 114 (i.e., only one slot) for fine adjustment in the number of tablet computer slots 114 desired for any given correctional facility.

Even further, modular component sub-assemblies could be provided including tablet computer slots 114 of different sizes to accommodate different form factors of different tablet computer devices 200. While in the computer kiosk system 100 illustrated in FIG. 1 ten table computer slots 114 are shown that all have the same size (e.g., the same height and width dimension in each tablet computer slot 114 as shown in FIG. 1), table computer slots of different size (in the width dimension or in the height dimension in the plane of FIG. 1) could be provided in the same or different modular sub-assembly. As such, by combining component sub-assemblies having different sizes of tablet computer slots 114, a given correctional facility may utilize the kiosk system 100 with tablet computer devices 200 of different sizes and form factors.

Locks 128 and wireless, inductive charging circuitry 134 may be provided in the modular component sub-assemblies. Likewise, wired connections via charging ports and non-inductive charging circuitry may be provided in the modular component sub-assemblies used to complete a table computer kiosk system 100 having the optimal number of tablet computer slots 114 for a given installation. Either way, the modular component sub-assemblies may be removed and replaced to ensure full operation of the computer kiosk system 100 in the event that one of the modular sub-assemblies needs maintenance or service for the locking assemblies, charging circuitry, etc. Spillproof drainage features may also be implemented in the tablet computer slots 114 for reliable operation thereof, and dustproof slot covers may be provided to protect the internal circuitry and mechanisms when the tablet computer devices 200 are removed from the tablet computer slots 114. Cooling fans and ventilation features may likewise be included to keep the computer kiosk system 100 and its component sub-assemblies from overheating in use.

The computer kiosk system 100 may include electronically controlled lock management hardware 126 that is programmed to implement a managed locking system to lock and unlock tablet computer devices 200 as desired, as well as to log and record inmate information relative to each tablet device 200 accessed, which may in turn be remotely viewed by a correctional facility administrator who wishes to see which of the tablet computer devices 200 has been checked out and specifically to whom and for how long. The computer kiosk system 100 may likewise include electronically controlled charge management hardware 132 that is programmed to implement a managed charging system wherein charging power would only be provided in a given tablet computer slot 114 when actually needed for charging a tablet computer device 200. When charging power is not needed, either because a tablet computer device 200 is not present in a table computer slot 114 or because the tablet computer device 200 is fully charged, the charger circuitry 134 may be disconnected from the main power supply 128, thereby reducing energy consumption by the computer kiosk system 100. Individual charging of the table computer slots 114 can also be activated and deactivated on a set schedule for charging, or manually activated by a correctional facility administrator when needed.

As an aspect of the lock management, apart from the computer kiosk system itself and the interface provided on the computer kiosk system 100 where an authorized inmate present at the location of the kiosk system 100 may login to access a table computer device 200, remote actuation of the physical locks 128 is also possible. For example, an administrator via an administrator interface such as that described further below, may click on an unlock button provided on the interface to unlock a specific tablet device 200 or a group of tablet computer devices 200 from a remote location. An administrator therefore need not physically access the computer kiosk system 100 at its particular location to unlock a tablet device 200 for retrieval and use. Lock and unlock commands may therefore be generated through the administrator interface and communicated to the physical locks 128 to provide a degree of redundancy or improved convenience if an authorized inmate user has difficulty checking out a locked tablet computer device 200.

FIGS. 2a and 2b are front and rear perspective views of a portable electronic device in the form of a tablet computer device 200 for use with the computer kiosk system 100 according to an exemplary embodiment of the present invention. In contemplated embodiments, the tablet computer device 200 may be a battery powered, processor-based device such an Android device or an IOS device including an 8 inch touchscreen. The tablet computer device 200 may be configured for single orientation use, and may be configured for fast, wireless charging by the kiosk system 100 or be configured with a charging port for battery charging by charging circuitry connected to the device 200 via a cable or wire. In contemplated examples, the tablet computer device 200 may include a 3200 mAh or greater battery offering extended use and long life, front and rear cameras having a desired resolution (e.g., 5MP), and a speaker/microphone. The tablet computer device 200 may also include a stand as shown, which may include a locking slot to receive a lock pin of the kiosk system 100 as described above. The tablet computer device 200 also includes power buttons, volume buttons, etc. implemented on the touch screen or as physical buttons. The tablet computer device 200 may also be configured with Factory Reset/Safe Mode Protection.

In contemplated embodiments, safe mode and factory reset may be enabled or disabled either locally on the tablet computer device 200 or from a remote location to provide the necessary security (or not) for certain users such as inmates, or for certain types of inmates, to make sure that the user cannot breach the tablet computer device 200 for improper use or access to unauthorized services, apps web content, etc.

In general, a factory reset of the tablet computer device 200 would revert the settings of the tablet computer device 200 to default factory settings that could potentially circumvent any security measures or security safeguards for certain types of end users (e.g., inmate users). While perhaps a factory reset may be advisable and unobjectionable for use by certain users and/or to address certain issues that the tablet computer device 200 may experience, access to the factory reset should be carefully controlled and preferably not be made available to other types of users. As such, in certain embodiments the factory reset option may not be accessible on the device 200 itself but instead may be accessed only by a system administrator, who may be a correctional facility administrator, to individually authorize a factory reset of a tablet computer device 200 or a group of tablet devices as desired and as further illustrated in the administrative interfaces described further below.

Likewise, activation of a "safe mode" of the tablet computer device 200 has potential to bypass any network/security measures that have been put in place and therefore provide a user of the device 200 unrestricted access to web content that would be inherently undesirable in certain environments such as correctional facility use by an inmate. While perhaps "safe mode" operation may be advisable and unobjectionable for use by certain users, access to safe mode should be carefully controlled and preferably not be made available to other types of users. As such, in certain embodiments the safe mode option is not made accessible on the device 200 itself, and instead may be accessed only by a system administrator, who may be a correctional facility administrator, to individually authorize safe mode operation of a tablet computer device 200 or a group of tablet computer devices as desired and as further illustrated in the administrative interfaces described further below.

The tablet computer device 200 may optionally also include an audio port such as a headphone jack, and a conventional charging port such as a micro-USB port, a lightning port, or a pin dock connector of conventional portable electronic devices. Asset tag location features, RFID features, and Wi-Fi or cellular connection features may also be provided, although in contemplated embodiments the tablet computer device 200 is configured to communicate exclusively with a kiosk services computer system 300 directly or indirectly through the kiosk system 100. The tablet computer device 200 in contemplated embodiments further includes a central processing unit including one or more processors, 16 GB of memory, 2 GB DDR+ memory, an accelerometer, and a light Sensor.

The tablet computer device 200 may be constructed from heavy duty materials such as steel and includes structural assembly techniques to define a so-called "jail-hardened" device that meets specific requirements of correctional facility installation to meet security needs.

Referring now to FIG. 3, the kiosk system 100 communicates with the kiosk services system 300 that is operative in reference to database 302 which includes correctional facility data and information, authorized inmate information and data, inmate privilege information and data, and non-inmate user data such as pre-authorized remote visitor data, financial account data and other data and information needed to perform the functions described. In contemplated embodiments the kiosk services system 300 may be a web-based, hosted services system such as the HomeWAV® system.

The tablet computer devices 200, once removed from the kiosk system 100 may wirelessly communicate with the kiosk services system 300 and may be utilized by the inmate to conduct visitations sessions or to participate in other services made available via the kiosk services system 300 to inmate users. Depending on system setup, the inmate user may or may not need to log-in into a tablet computer device 200 to connect with the kiosk services system 300 after successfully obtaining access to one of the tablet computer devices 200. The tablet computer device 200 runs an inmate user interface with predetermined selection menus and options for the inmate to access different services that are pre-approved for use in the controlled environment of the correctional facility. As such, web content and access to external devices and systems may be tightly controlled, and inmates are generally precluded from using the tablet computer devices 200 apart from the kiosk services system 300.

It is noted that a web-based, hosted services system is only one of many ways that the kiosk services system 300 could be implemented. Networked, server-based systems may be provided that do not necessarily require web access to operate, and the kiosk services system 300 could in some cases be located in a correctional facility, as opposed to remotely located. Numerous system architectures, distributed or undistributed, may be employed in the kiosk services system 300 in various embodiments with otherwise similar functionality from the inmate user perspective. In certain embodiments for smaller inmate populations, the kiosk services system 300 need not be a server-based system and could be run on single computer devices or combinations of computer devices that do not include computer servers. While FIG. 3 shows one kiosk system 100 and one kiosk services system 300, it is understood that in any given correctional facility more than one computer kiosk system 100 may be provided, and each computer kiosk system 100 may interface with more than one kiosk services system 300 providing different services.

In contemplated embodiments, a tablet computer device 200 may be checked-out by an inmate user for a predetermined amount of time which may depend on availability of funds to cover any charges for use of the tablet computer device 200. In some cases wherein no financial funds are available, an inmate may not be able to check-out one of the tablet computer devices 200 at all, despite being an authorized user having active privilege status that would otherwise permit the inmate to use one of the tablet computer devices 200.

For monitoring and oversight, the kiosk services system 300 may include an administrator interface 304 and database 306 including similar or different information to the database 302. Authorized, correctional facility administrators may log-in and access the administrator interface 304 via respective administrator computer devices 308, 310, 312, 314 and select or adjust system settings and preferences, as well as oversee inmate use of the tablet computer devices 200. Any number n of administrators and administrator computing devices of any kind (e.g., dedicated computer terminal or workstation, desktop computer, laptop or notebook computer, tablet computer, smartphone, etc.) may be accommodated.

Correctional facility administrators, via the computer devices 308, 310, 312, 314 and the administrator interface 304 can locally or remotely view a state of charge (e.g., charge %) of individual tablet computer devices 200 in the computer kiosk system 100 or individual tablet computer devices 200 that are removed from the computer kiosk system 100 for use, and facility administrators can enable or disable privileges of individual inmates to use the kiosk system 100 to access one of the tablet computers 200. Administrators can also locally and remotely monitor specifically which one of the tablets 200 is checked out and which one of the inmates checked it out. Administrators can likewise locally and remotely monitor which of the respective tablet computer devices 200 has been returned and checked in, and whether each tablet computer device 200 was turned in on time and slotted properly by an individual inmate in the kiosk system 100. Administrators may also locally or remotely view and monitor a detailed audit trail of each tablet computer device 200 as it is used over time. Real-time monitoring of specific use of a tablet computer device 200 is possible, such as a monitoring of an online visitation session in progress with a remote visitor, or activity can be recorded and saved for subsequent recording and security monitoring. Privileged communications with legal counsel or clergy may be excepted from security monitoring or recording as needed. Detailed archives may be obtained and reports may be generated for use by administrators for investigative purposes or to assess overall use and performance of the computer kiosk system 100 as it is used by inmates. Different levels of access may be provided to different administrators to oversee the use of tablet computer devices 200.

Alarms and notifications may be provided to administrators via the computer devices 308, 310, 312, 314 and the administrator interface 304 to alert them of failed log-in attempts, improper attempts to obtain a tablet computer device, error conditions of the computer kiosk system or error conditions of the respective tablet computer devices 200, improper use of a tablet computer device 200, tablet computer devices 200 that are not timely checked-in or returned to one of the tablet computer slots 114, or other events of interest to the security needs of the facility that may require the attention of and possible intervention by an administrator.

The computer kiosk system 100 may initially be fabricated and assembled to include any number n of tablet charging slots 114, locks 128, chargers 134, etc. desired to meet anticipated needs for the desired number n of tablet computer devices 200. The number n may be different from facility to facility, but by virtue of the modular assemblies described above, different numbers n are easily accommodated in an economical manner.

In the event that needs change in any given correctional facility, or when the anticipated needs did not prove to be correct, one or more expansion modules 320 in the form of modular component sub-assemblies as described above may be added to the computer kiosk system 100 at any point desired to provide additional tablet computer slots 114 to accommodate an increased number of tablet devices 200 with similar device management and charging features to those originally provided computer kiosk system 100. Likewise, one or more expansion modules 320 may be removed from the computer kiosk system 100 to reduce the number of tablet charging slots 114 for use of the system 100 with a reduced number of tablet devices 200. Therefore, the computer kiosk system 100 may be retrofit and reconfigured to accommodate more or less tablet devices 200 as desired or as needed to address under capacity or overcapacity issues as the needs of the facility change over time.

Also, when the computer kiosk system 100 is initially configured to accommodate n tablet computer devices 200 of a given size (e.g., devices 200 having eight inch screens), one or more expansion modules 320 can later be provided and connected to accommodate an additional number n of tablet computer devices 200 of a different size (e.g., devices 200 having ten inch screens). As such, the computer kiosk system 100 is not rendered obsolete via adoption of different sizes of tablet computer devices 200 as preferences change. Unlike custom fabricated computer kiosk systems, the configurable computer kiosk system 100 is not limited to specific sizes of tablet computer devices 200 at the time manufacture and installation, but may be desirably modified for flexible use with other sizes and form factors of tablet devices at a subsequent time. As previously mentioned, inductive and non-inductive charging is possible to accommodate different types of tablet computer devices that may require or may benefit from different types of charging.

The controller 120 may intelligently detect an addition or removal of expansion modules 320, and may cause notifications or alerts to administrators of a change in configuration of the computer kiosk system 100 as an appropriate security safeguard.

While FIG. 3 illustrates an exemplary architecture of the computer kiosk system 100 according to an exemplary embodiment of the invention having certain benefits described, alternative system architectures are possible to realize at least some of the benefits described to the same or different degree.

Figure 4:
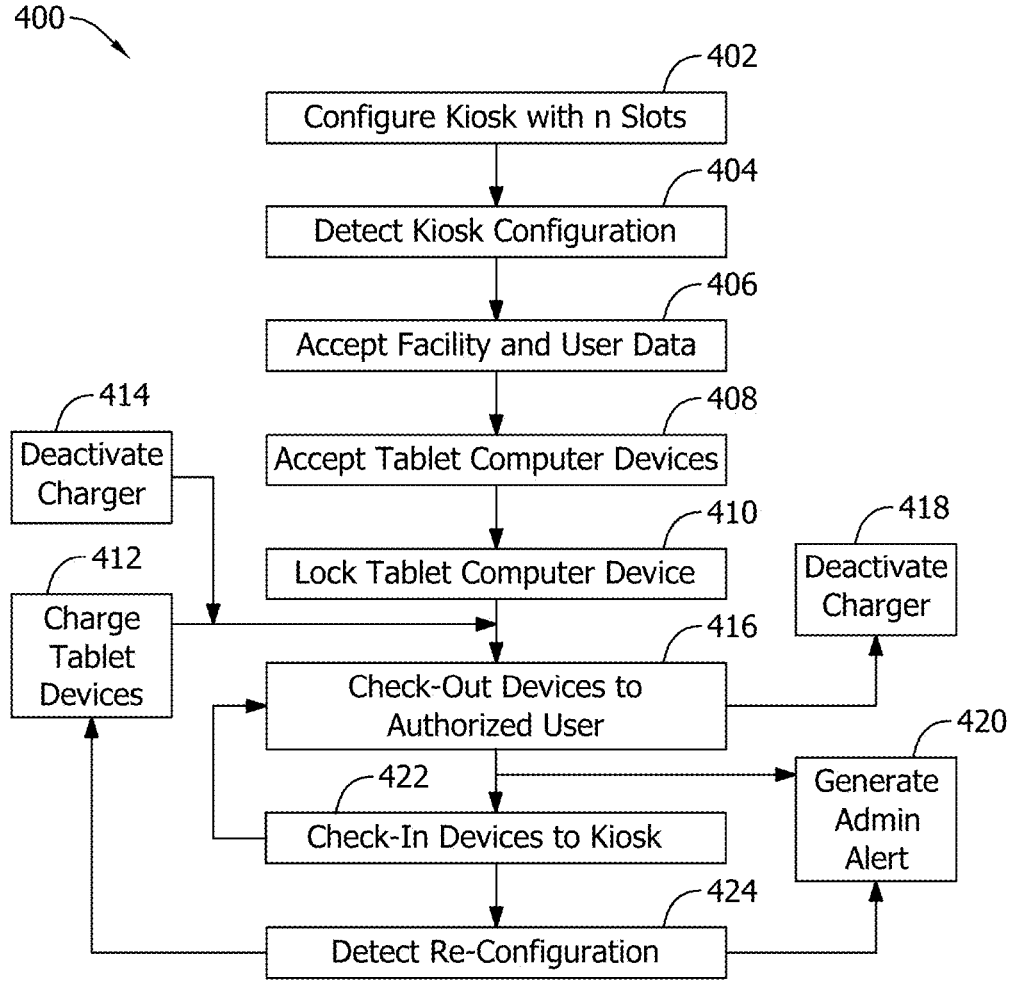
FIG. 4 is a method flowchart of processes illustrated by the correctional facility kiosk device and system shown in FIGS. 1 and 3.

FIG. 4 is a method flowchart of processes 400 implemented by the computer kiosk system 100 shown in FIGS. 1 and 3. The processes may be implemented as algorithms in the programming of the kiosk controller 120.

At step 402, the computer kiosk system 100 is configured with a number n of tablet computer slots 114 as described above. The configuration at step 402 may be performed by the manufacturer of the kiosk as an initial preparatory step of the method 400, or may be completed on-site by a kiosk system installer at a correctional facility by assembling modular component sub-assemblies to realize the desired number n of tablet slots 114 at a point in time subsequent to initial installation. The configuration step 402 may also optionally include fastening the kiosk to a wall or support as described, although embodiments are contemplated wherein the configured system is portable or freestanding and therefore not fixed in place to a wall or support in certain installations.

At step 404, the kiosk system 100 is fully assembled and installed and powered on, and the controller 120 then detects its configuration to determine the number n of tablet slots 114 in the system as configured. Step 404 may include uniquely identifying each of the number n of tablet slots 114 for subsequent use and tracking of tablet computer devices 200.

At step 406, facility and user data is accepted. The facility and user data may include information unique to each correctional facility that connects to the kiosk services system 300 and inmate user data such as identification data and biometric data used to securely identify inmates logging into the computer kiosk system 100 or a tablet computer device 200 that is successfully checked-out and removed from the computer kiosk system. The user data may also include financial account information which may be applied as a restriction to whether an inmate may check out a tablet computer device 200 or as restriction for how long the tablet computer device 200 may be checked out. The user data may also include administrator data including administrator identification and login data and administrator preference data. Data and information accepted at step 406 may be directly or indirectly received, and may include access to the kiosk service database 302 or the administrator database 306. The technical effect of the processes and systems described herein is achieved when such data and information is entered, transmitted, downloaded or otherwise accepted by the computer kiosk system 100 or made available to the processor-based kiosk system 100 via the aforementioned databases.

At step 408, tablet computer devices 200 are accepted into the number n of tablet slots 114. The tablet computer devices 200 may be self-identifying to the kiosk system 100 as they are inserted into the respective slots 114 using, for example, a machine readable bar code or another machine readable element recognized by the system. Near Field Communication (NFC) using a known protocol, short-range communication via known Bluetooth standards and protocol, or Wi-Fi communicating via a Local Area Networking (LAN) according to known protocols may also facilitate automatic identification of tablet computer devices 200 to the kiosk system 100. Alternatively, each tablet computer device may be assigned a unique identity as it is inserted into the respective tablet computer slots 114 of the kiosk system. Likewise, the computer kiosk system may include dual in-line package (DIP) switches and the like to enable the functionality described. Regardless of how the tablet computer devices are identified, the computer kiosk system 100 can then know specifically which tablet computer device has been checked-out to which inmate for monitoring and oversight purposes in the correctional facility. The tablet computer device identity data for each tablet computer device being managed through the system may be stored in one of the system databases and retrieved when needed.

At step 410, the tablet computer devices 200 are locked in the number n of tablet computer slots 114 via the locking mechanisms 128 provided. Charger circuitry 134 may then be activated at step 412 to charge the tablet computer devices 200 individually or as a group by connecting the charger circuitry 134 to the power supply 138. The battery charge on each tablet computer device 200 can then be monitored, and when each device 200 is fully charged the respective charger circuitry 134 can be disconnected at step 414 from the power supply 138 to reduce power consumption. In contemplated embodiments, priority charging is executed, wherein tablet computer devices 200 having the lowest battery charge are charged first before a charging of tablet computer devices having a higher charge. In the priority charging scenario, charging circuitry outputs may be shared in the various different tablet computer slots 114 and thus a one-to-one relation of charging circuits and tablet slots 114 is not necessarily required and more energy effi- cient charging of a plurality of tablet computer devices is possible.

At step 416, the controller 120 of the computer kiosk system 100 allows check-out of a tablet device 200 to an authorized user. Step 416 includes accepting login data and any biometric data to uniquely identify an inmate user, and comparing such login and biometric input received to the user information in the system database(s) to confirm that the inmate user is authorized to access a tablet computer device 200 and has an active and current privilege status that does not revoke or suspend the authorized access at the time the inmate logs in to the kiosk computer system 100. If the inmate user is not identified as an authorized inmate user, or if an identified and otherwise authorized inmate user is subject to privilege revocation or suspension of privilege that bars access to a tablet computer devices, access to a tablet computer device 200 is denied by the system. Other- wise, access to a tablet device 200 is granted to an identified and authorized user, and one of the tablet devices 200 is unlocked for retrieval and use by the identified, authorized user. An indicator may be lit to show the inmate user which of the tablet computer devices 200 to retrieve, and the inmate user may simply pull the unlocked tablet computer device 200 from the tablet computer slot 114 for use. As described above, an unlocked computer device 200 may in some embodiments be partially ejected from one of the tablet computer slots 114 as a visual cue for the user to retrieve the unlocked tablet computer device 200.

When a tablet computer device 200 is removed by the inmate user, at step 418 the charger circuitry 134 for the slot 114 from which the tablet computer device 200 has been removed is optionally disabled. Timers and the like may be set for the removed tablet computer device 200 to be returned, which may be displayed to the inmate user on the screen of the tablet computer device 200. After removal from the tablet computer slot 114, the inmate user may re-enter login information to the tablet device 200 when needed to connect to the kiosk services system 300. Other- wise, the tablet computer device 200 may automatically connect to the kiosk services system 300 when removed from the tablet computer slot 114. Regardless, once the tablet computer device 200 is connected to the kiosk ser- vices system 300, the inmate user may proceed to use any service provided and made accessible to the inmate user, including but not limited to video visitation services.

If the inmate user does not timely return the tablet computer device 200 at the expiration of the timer, a notice or alert may be generated to administrators. Notices or alerts may likewise be generated for any detected misuse or error condition of the tablet computer device 200 or the computer kiosk system 100. Such notices or alerts may be generated and delivered to administrators in any form via any medium desired in an active or passive alert (e.g., email, SMS text notification, voice message, push notification, etc.).

While the tablet computer devices 200 are checked-out, administrators may locally or remotely monitor inmate use of the tablet devices 200 as described above. The extent and nature of the inmate's use of the tablet computer device may be recorded and archived in system databases and detailed reports may be generated on an inmate-by-inmate basis or a group basis, as well as on a device-by-basis basis or based on a group of devices.

At step 422, the tablet devices 200 are checked-in as inmate users return them to one of the tablet computer slots 114. The tablet computer slot 114 for return of the tablet computer device may or may not be the same slot 114 from which the tablet computer device 200 was removed at check-out. The inmate user may log back into the computer kiosk system 100 as part of the check-in process so that the system 100 knows which inmate is checking-in the tablet computer device 200. In embodiments wherein the tablet computer devices 200 are self-identifying to the computer kiosk system 100, the kiosk system 100 can also confirm that the inmate user is returning the same tablet computer device 200 that was checked out. The check-in time and any details are recorded by the system as a reportable event that is archived for subsequent retrieval when needed. The checked-in tablet computer device 200 is automatically locked and re-charged by activating the charger circuitry for subsequent use when checked out again. In some embodi- ments, only fully-charged tablet devices 200 are made available for check-out.

At step 424, the kiosk controller 120 detects a reconfigu- ration of the computer kiosk system 100 when tablet charg- ing slots 114 are added or subtracted. At step 420, an active or passive notice or alert is generated to administrators that the kiosk system 100 has been reconfigured so that the administrators may act accordingly to oversee the use of the reconfigured number of tablet computer devices. In the event of system maintenance wherein a modular component sub-assembly is swapped out because of a maintenance or service procedure, the kiosk controller 120 can detect the change and notify administrators accordingly. Attempts to tamper with the system can therefore readily be detected.

FIGS. 5-13 are various views of a second exemplary embodiment of a configurable correctional facility computer kiosk system 500 featuring a main kiosk assembly 502 and a modular charging bay assembly 504 for portable comput- ing devices such as tablet computer devices. Like the computer kiosk system 100, the main kiosk assembly 502 and the modular charging bay assembly 504 are separately fabricated as sub-assemblies, and when assembled in com- bination define an expandable and scalable number n of tablet computer slots 114 in the kiosk system 500 while avoiding custom fabrication of kiosks to meet different numbers n of tablet slots 114 to meet the needs of different correctional facilities.

The main kiosk device assembly 502 includes the touch screen monitor 116 and optionally may also include the handset 118 as described above in relation to the computer kiosk system 100, but unlike the computer kiosk system 100, in the example shown the main kiosk device assembly 502 in the computer kiosk system 500 does not include any tablet charging slots 114. As such, in the computer kiosk system 500, all of the tablet computer slots 114 are provided in one or more of the modular charging bay assemblies 504 that are attached to the main kiosk device assembly 502 on one end thereof.

Figures 5, 6, 7:
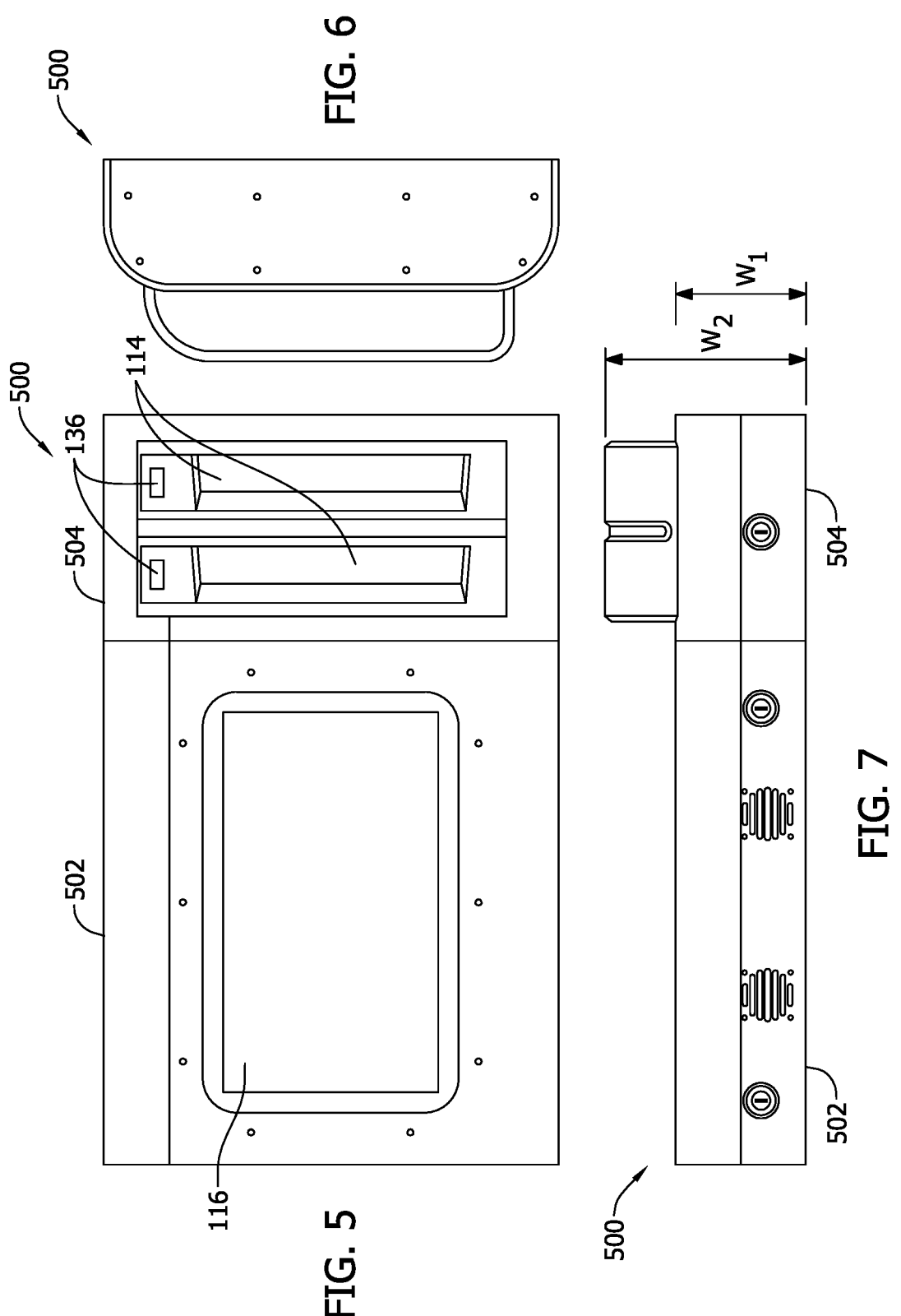
FIG. 5 is a front view of a second exemplary embodiment of a configurable correctional facility computer kiosk system featuring a main kiosk device assembly and a modular charging bay assembly for a number of portable computing devices such as tablet computer devices.
FIG. 6 is an end view of the configurable kiosk system shown in FIG. 5.
FIG. 7 is a bottom view of the configurable kiosk system shown in FIG. 5.

As best shown in FIGS. 6 and 7, the tablet computer slots 114 protrude outwardly relative to the cabinet housing of the main kiosk device assembly 502. The main kiosk device assembly 502 therefore has a more compact design than, for example, the corresponding main kiosk assembly in the kiosk system 100. Specifically, in the width dimension (which may be measured perpendicularly to a vertical wall upon which the kiosk system 500 is mounted in a contem- plated embodiment), the main kiosk assembly 502 has a first width dimension $W_1$ and the portion of the modular charging bay assembly 504 has a second width dimension $W_2$ wherein the tablet computer slots 114 reside. The second width dimension $W_2$ is greater than the width dimension $W_1$ whereas in the computer kiosk system 100 the width dimension is the same in the main kiosk assembly and in the add-on assemblies including additional tablet computer slots 114. Relative to the computer kiosk system 100, the computer kiosk system 500 therefore occupies a reduced amount of space when installed and may be manufactured at lower cost since less material is needed in the manufacture thereof.

Figure 8:
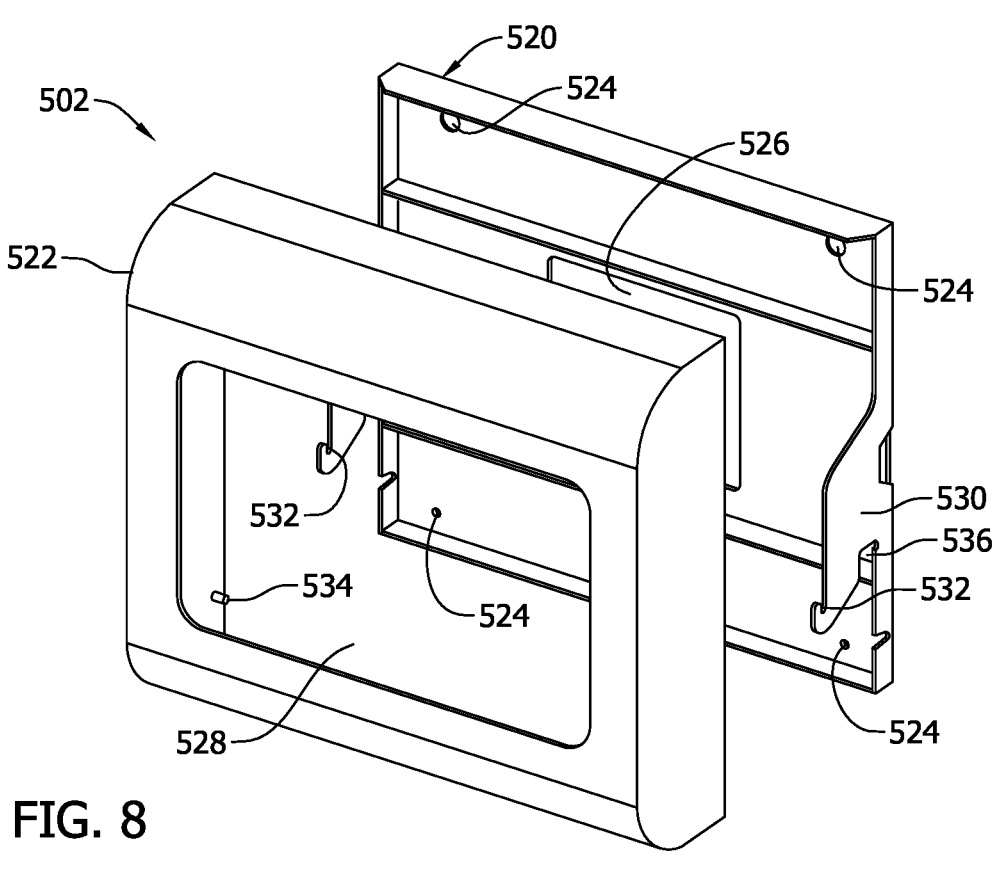
FIG. 8 is a partial exploded view of an exemplary main kiosk device assembly for the system shown in FIGS. 5 through 7.
Figure 9:
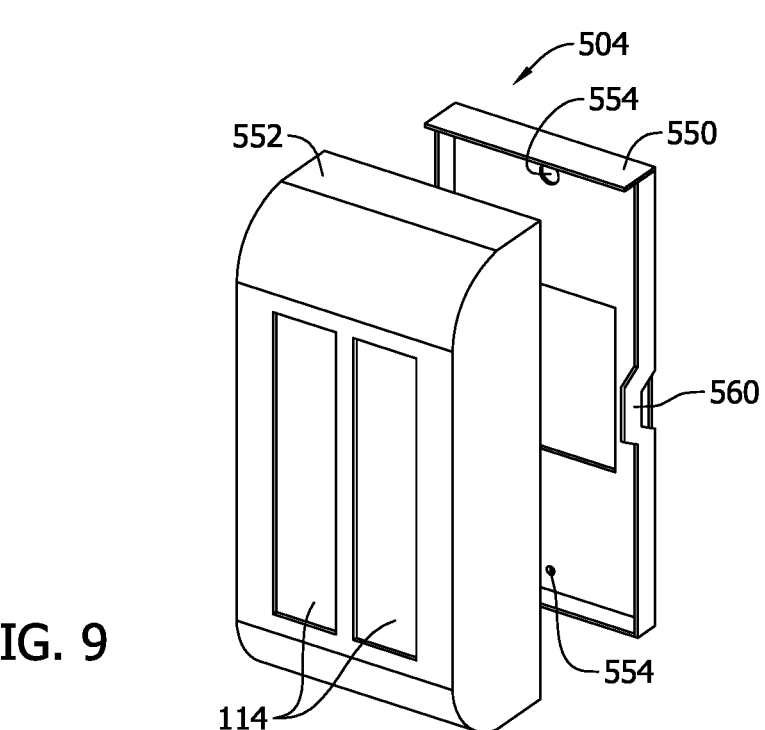
FIG. 9 is a partial exploded view of an exemplary modular charging bay for the main kiosk device assembly and the kiosk system shown in FIGS. 5 through 8.

As shown in the exploded views of FIGS. 8 and 9, each of the main kiosk assembly 502 and the modular charging bay assembly 504 includes a two part housing structure that may be constructed from heavy duty materials such as steel and may include structural assembly and fabrication techniques to provide a so-called "jail-hardened" device meeting applicable and specific requirements of correctional facility installation. Such "jail-hardened" construction may be considered optional in some facilities and need not be employed, and in such a scenario materials other than steel, including other metallic materials and non-metallic materials such as plastic may be utilized in whole or in part to manufacture the assemblies 500 and 502.

Figure 13:
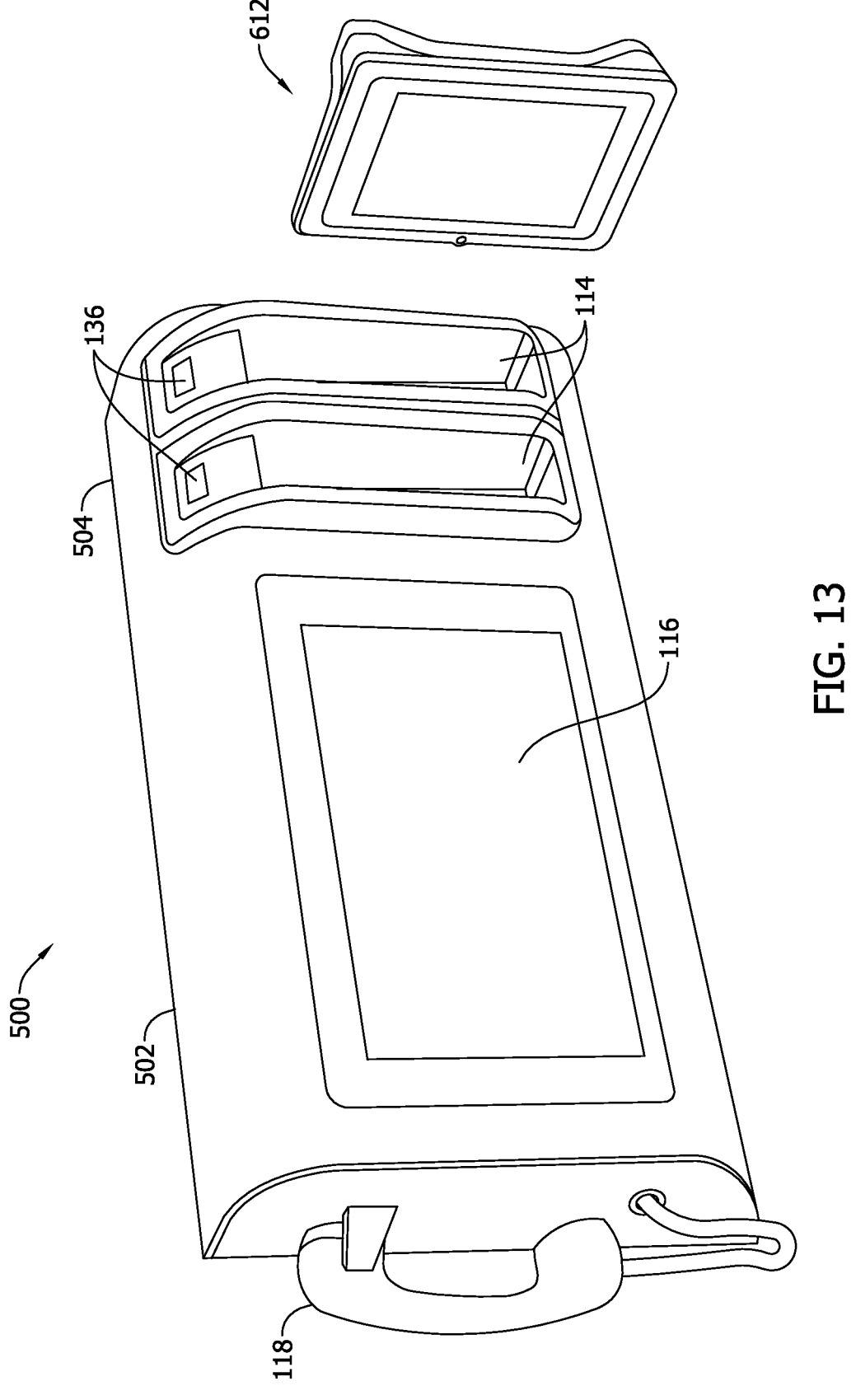
FIG. 13 is a perspective view of the kiosk system shown in FIG. 5 with an exemplary portable electronic device.

As shown in FIG. 8, the main kiosk assembly 502 includes a back panel or backplate 520 that is configured to be attached to a wall, and a main kiosk housing 522 that is supported by the backplate 520. The backplate 520 includes mounting apertures 524 that may receive fasteners such as screws or wall anchors to attach the backplate 520 to a wall or other support structure. The backplate 520 is further formed with a large central opening 526 to facilitate electrical connection to a power system of the facility via connecting wires and the like to power the controller in the main kiosk assembly 502, the touch screen 116 and the handset 118 (FIG. 13) that is attached to the main kiosk housing 522. The main kiosk housing 522 is in turn formed with a central opening 528 that provides access to the touch screen 116 as shown in FIG. 13.

The backplate 520 further includes opposing side brackets 530 that support the main kiosk housing 522 in a closed position (FIGS. 5-8 and 13) and an open position (FIG. 11) sometimes referred to as a service position providing access to the internal components of the main kiosk assembly 502 (e.g., the touch screen 116, circuit board or circuit boards provided, power connections, DIP switches, data connectors and connections, etc.). Specifically, the side brackets 530 are formed to include cradles 532 at their distal ends that receive respective pins 534 (FIG. 10) provided on an interior of each lateral side of the main kiosk housing 522. When the pins 534 are received in the cradles 532, the main kiosk housing 522 is rotatable relative to the side brackets 530 between the closed position and the open position. Open slots 536 are also provided on the lower end of each side bracket 530 that receive a lower interior edge 538 (FIG. 11) of the main kiosk housing 522 when the main kiosk housing 522 is opened, such the main kiosk housing 522 remains supported by the backplate 520 in the open position. Considering that the computing components and touchscreen 116 of the main kiosk assembly 502 are attached to the main kiosk housing 522 this is important to prevent any inadvertent separation of the main kiosk housing 522, or any possibility that the main kiosk housing 522 could be accidentally dropped by a person attempting to perform a maintenance procedure.

Additionally, the main kiosk housing 522 in the example shown is rotatable or tiltable upon the backplate 520 approximately 90° between the opened and closed positions. As such, the main kiosk housing 522 is vertically supported in the closed position, and horizontally supported in the open position. The horizontal position when the main kiosk housing 522 is opened provides optimal clearance and access to install and setup the kiosk system and make the necessary power input connections, connections from the main kiosk assembly 502 to the desired number of modular charging bays 504, and data connections for remote monitoring purposes. The horizontal positioning of the main kiosk housing 522 also provides clear access to inspect connections, perform troubleshooting or maintenance procedures, or to add another charging bay 504 or swap an old charging bay 504 for a new charging bay 504 at a time subsequent to initial installation. Adding or swapping charging bays 504 may facilitate a change in form factor of tablet computer devices that can be accepted via differently configured tablet computer slots 114, may facilitate implementation new features in the charging bays in a retrofit manner, etc. Plug and play hardware/software changes may be beneficially realized via the add-on charging bays 504, and the computing equipment in the main housing 522 may also be removed and replaced as desired to implement new hardware/software changes when desired. The computer kiosk system 500 is therefore flexible to meet changing needs of a facility over time, and is considerably less likely to become obsolete as a custom-fabricated kiosk system would that lacks such flexibility and configurability in a retrofit manner to change the number of tablet computer slots 114 as well as the size of the tablet computer slots 114 for use with new and different form factors of tablet computer devices.

As shown in FIG. 9, the modular charging bay assembly 504 also includes a back panel or backplate 550 that is configured to be attached to a wall, and a kiosk housing 552 that is supported by the backplate 550. The backplate 550 includes mounting apertures 554 that may receive fasteners such as screws or wall anchors to attach the backplate 550 to a wall or other support structure. The backplate 550 is further formed with a large central opening 556 to facilitate electrical connection to a power system of the facility via connecting wires and/or to facilitate electrical connection or data connection to the components attached to the main kiosk housing 552. The kiosk housing 552 is in turn formed with the tablet charging slots 114.

The backplate 550 further includes opposing side brackets 560 that support the kiosk housing 552. In the example shown in FIG. 9, the kiosk housing 552 in the modular charging bay assembly 504 is not rotatable or tiltable relative to the backplate 550 as the main kiosk housing 522 is as described above, although in another embodiment the kiosk housing 552 and attached components could be rotated or tilted if desired by providing similar features in the backplate 550 and the kiosk housing 552. Instead, the kiosk housing 552 is simply locked in place to the backplate 550 in a secure manner that may or may not include fasteners such as screws, but when desired the kiosk housing 522 and components attached thereto may be removed from the backplate 550 to facilitate service or replacement. In the case of replacement with a kiosk housing 552 having a different form factor of the tablet charging slots 114 or of the housing 552 overall, the backplate 550 may or may not need to be replaced.

Figure 10:
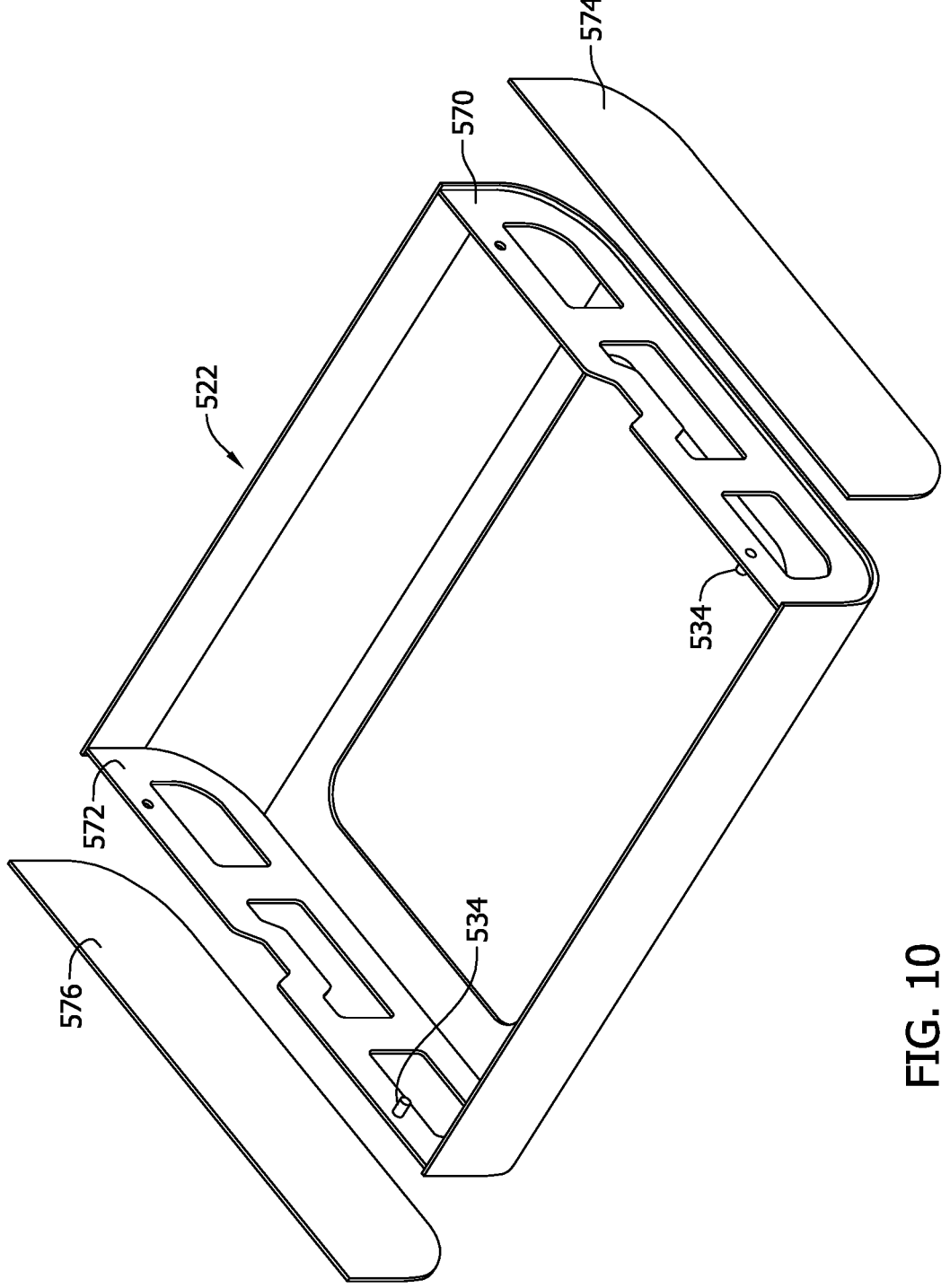
FIG. 10 is a partial exploded view of the main kiosk device assembly shown in FIG. 8.
Figure 11:
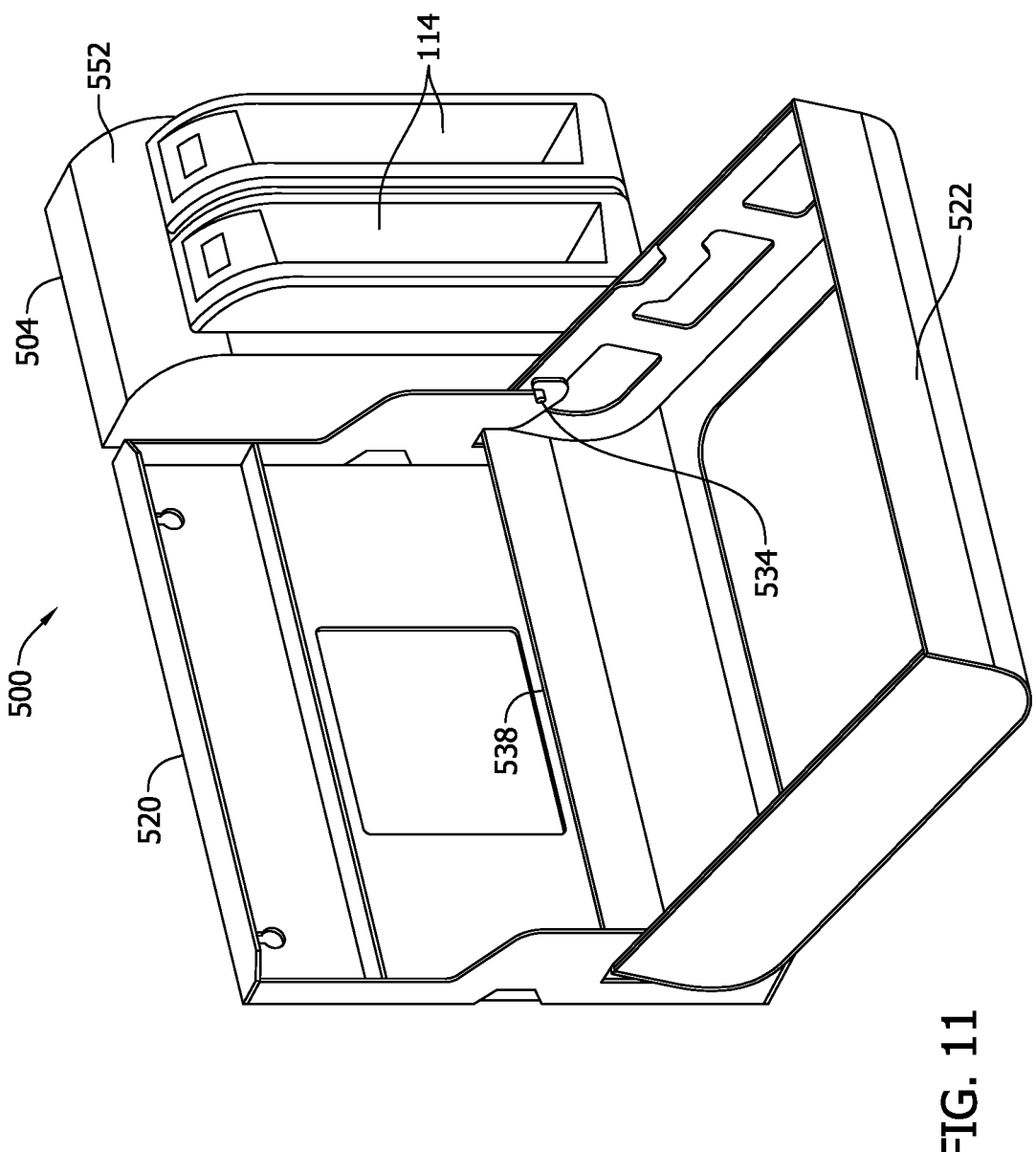
FIG. 11 is a perspective view of the kiosk system shown in FIG. 5 shown with the main kiosk cover of the main kiosk device assembly in a service position.

As shown in FIG. 10, the main kiosk housing 522 also includes open frame lateral side walls 570, 572 and modular panels 574, 576 attachable to the lateral side walls 570, 572. The panel 576 is a closed panel while the panel 574 is configured as a handset panel by including openings to attach a handset cradle and a through-hole for the handset wire to connect to the computing equipment in the main kiosk housing 522. By virtue of the modular panels 574, 576 the handset 118 can be placed on either side of the main kiosk assembly 502. For example, and considering FIG. 13 the handset 118 is shown on the left side of the main kiosk housing 522 of the main kiosk assembly 502, whereas it could easily be attached on the right side instead. Likewise, the modular charging bay 504 is located on the right side of the main kiosk assembly 502 in FIG. 13, but it may instead be located on the left side via changing the location of the backplate 550 relative to the backplate 520. Again, considerable flexibility is provided in how the computer kiosk system 500 may be installed to meet the preferences of different facilities. Of course, in some embodiments, the handset 118 could be considered optional and need not be provided, and modular charging bays 504 could be provided on both of the lateral sides of the main kiosk assembly 502 if desired.

In the illustrated example, the modular charging bay 504 defines two tablet slots 114 to receive a respective tablet computer device in each slot. Connector components are included in the modular charging bay 504 to provide power and data connections as needed to charge and monitor a state of the tablet computer devices while in the computer kiosk system 500, to perform software updates for tablet computer devices or to facilitate other administrative processes in configuring or reconfiguring the computer kiosk system from the perspective of system administrators, correctional facility administrators or overseers, inmate users, or remote users such as visitors that are provided access to the computer kiosk system. As such, while the computer kiosk system 500 shown in FIGS. 5 and 13 includes one charging bay assembly 504 including two tablet charging slots 114, one or more additional charging bay assemblies 504 may be provided to expand the number of charging slots by two each, and as such the kiosk system 500 may be configured with any number n of charging bay assemblies 504 to ultimately provide a charging system having a number 2n of tablet computer slots 114. Following this example, different computer kiosk systems 500 may be installed in different facilities having two, four, six, eight, ten, etc. tablet computer slots 114 in each computer kiosk system. Likewise, more than one computer kiosk system 500 may be installed in the same or different areas of a correctional facility, but having different numbers of tablet computer slots 114 via different numbers of modular charging bay assemblies 504. Regardless, the computer kiosk systems 500 may be manufactured in a limited number of modular sub-assemblies at relatively low cost while still realizing a wide variety of computer kiosk systems having different numbers of tablet computer slots, as opposed to more expensive, individualized and custom-fabrication of kiosk devices having uniquely different numbers of built-in tablet computer slots.

The modular charging bays 504 in other embodiments could be provided having greater or fewer than the two tablet computer slots 114 illustrated for the kiosk system 500, and more than one type of modular charging bay could be provided having different numbers of tablet computer slots that may be used in combination to provide further installation options and flexibility while otherwise still maintaining a limited number of modular assemblies that can be combined to achieve different numbers of tablet computer slots in whatever amount desired on a per-facility or per-location basis, including odd or even amounts of tablet computer slots 114.

Figure 12:
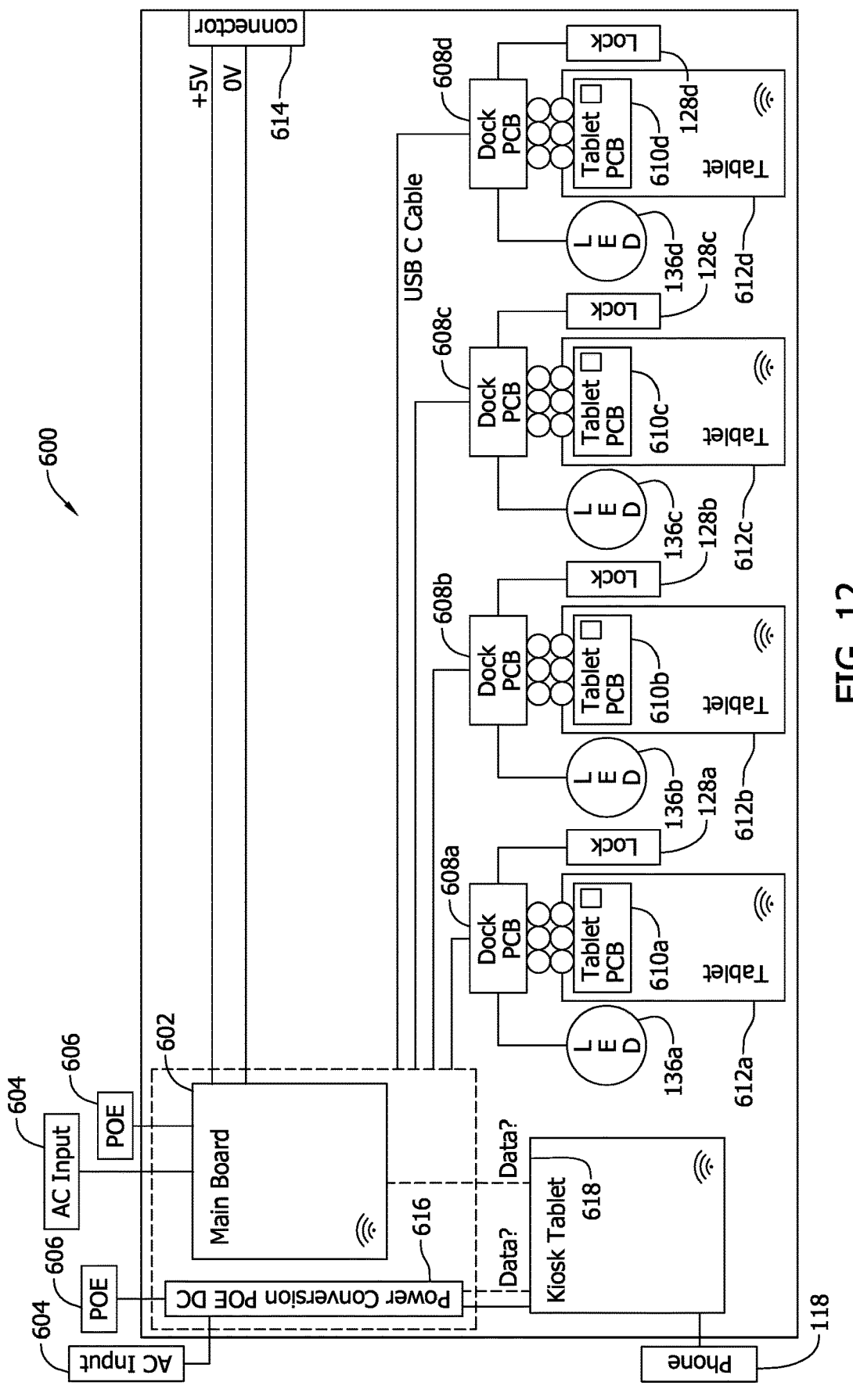
FIG. 12 is a schematic diagram of an exemplary system architecture for the kiosk system shown in FIG. 5.

FIG. 12 is a partial block diagram of a system architecture 600 for the computer kiosk system 500 described above. The computer kiosk system 500 is configured for dual power input operation via, for example, a conventional 120V alternating current (AC) power supply in the correctional facility at input 604 and/or via a conventional 50V direct current (DC) power over Ethernet (POE) power supply at input 606. As such, POE power and/or AC power may be used to energize and operate the kiosk system as a whole, or to charge battery components provided in the main kiosk assembly 502 or battery components of tablet computer devices received in the tablet computer slots 114. Such dual power input and dual power operation is beneficial when installing computer kiosk systems 500 in older correctional facilities wherein power supply wiring limitations exist and/or provides a further degree of flexibility in the installation and powering of computer kiosk systems in different installations or to install and power add-on components (e.g., additional modular charging bays) over time.

As shown in FIG. 12, the system architecture 600 includes a main circuit board 602 that is connectable to the AC power input 604 or POE input 606. In contemplated embodiments, the main circuit board 602 includes power conversion circuitry and/or regulator circuitry to feed electrical power, at an appropriate direct current (DC) voltage or current, to respective dock connectors 608a, 608b, 608c, 608d provided in the modular charging bays 504. The dock connectors 608a, 608b, 608c, 608d may be provided on or interface with circuit boards provided in the modular charging bays 504. The dock connectors 608a, 608b, 608c, 608d interface with charging and/or data ports that provide connection to circuit boards 610a, 610b, 610c, 610d in the tablet computer devices 612a, 612b, 612c, 612d when received in tablet computer slots 114.

In contemplated embodiments, each dock connector 608a, 608b, 608c, 608d is associated with a unit id, set by a DIP switch in one example, that will be used to identify the connectors (or circuit boards associated with the connectors) when they are daisy chained, for example, on a single ethernet/poe connection. As such, multiple modular charging bays may establish power and data connections through a daisy chain arrangement when needed or when desired. Such a daisy chain arrangement beneficially simplifies installation of the kiosk system by eliminating separately provided wire connections from each modular charging bay to the main circuit board 602, although such individually wired modular charging bay embodiments are also possible.

FIG. 12 schematically illustrates connections to four tablet computer devices using two of the dual charging slot charging bays 504 shown in FIGS. 5 and 13, while it is understood that further modular charging bays 504 could be provided defining additional tablet computer slots 114 and including additional dock connectors and circuit boards. Additionally, lock elements 128 and indicators 136 are provided in the modular charging bays 504 as described above. Battery charge indicators 130 may also be provided in the charging bays 504. In some cases, the indicators may be dual-function indicators capable of conveying a lock/unlock status or a battery charge status as desired.

The main circuit board 602 also includes a data connector 614 such as a universal serial bus (USB) connector allowing the circuit board 602 to communicate with an external computer device for monitoring and oversight purposes. The main circuit board 602 may be configured for bidirectional communication with circuit boards in the modular charging bays 504 or the tablet computer devices connected to the modular charging bays 504 and with a remote computer device such as the kiosk services system 300 (FIG. 3) or an administrative device 308, 310, 312 and 314 (FIG. 3) for the purposes described herein.

The system architecture 600 may also include power conversion circuitry 616 receiving power from AC input 604 or POE input 606 and supplying output power at an appropriate direct current (DC) voltage or current to power the computer equipment 618 of the main kiosk assembly 502. The computing equipment 618 may in some embodiments be a tablet computer device that is attached to the main kiosk housing 522 (FIGS. 8, 10, 11) as described above, or may be other processor-based arrangements of circuit boards and screen display for the main kiosk assembly 502. The computing equipment 618 is also optionally connected to the handset 118. As desired, data may be communicated between the computing equipment 618 and the main circuit board 602 for remote communication and monitoring. Data may also be communicated via Ethernet connection to a remote computer device for monitoring and oversight purposes.

While an exemplary architecture is shown and described, other architectures are possible to realize similar functionality and benefits in the computer kiosk system 500. The processes utilized by the computer kiosk system 500 and architecture 600 may be similar to that explained above in relation to FIGS. 3 and 4 and the computer kiosk system 100 with similar benefits.

Additionally, the main board 602 and/or computing equipment 618 may be provided with a tablet charging bay locking system application programming interface (API) that allows the tablets 612 to be remotely locked and unlocked via a browser accessible to a facility administrator. The main circuit board 602 and and/or computing equipment 618 may also be configured, via the API and user preference, to realize intelligent power distribution to connected tablet devices 612 to feed charging power first to tablet computer devices having the lowest battery charge level and then to connect and supply charging power to tablet devices having higher battery charge levels for improved energy efficiency or resource allocation when limited power is available to charge the tablet computer devices. The main circuit board 602 and and/or computing equipment 618 may also be configured, via the API and user preferences, to allow the computing equipment 618 and charging bays 504 to communicate with one another to perform the desired checking in and out of the tablet devices to authorized persons such as inmates.

Figure 14:
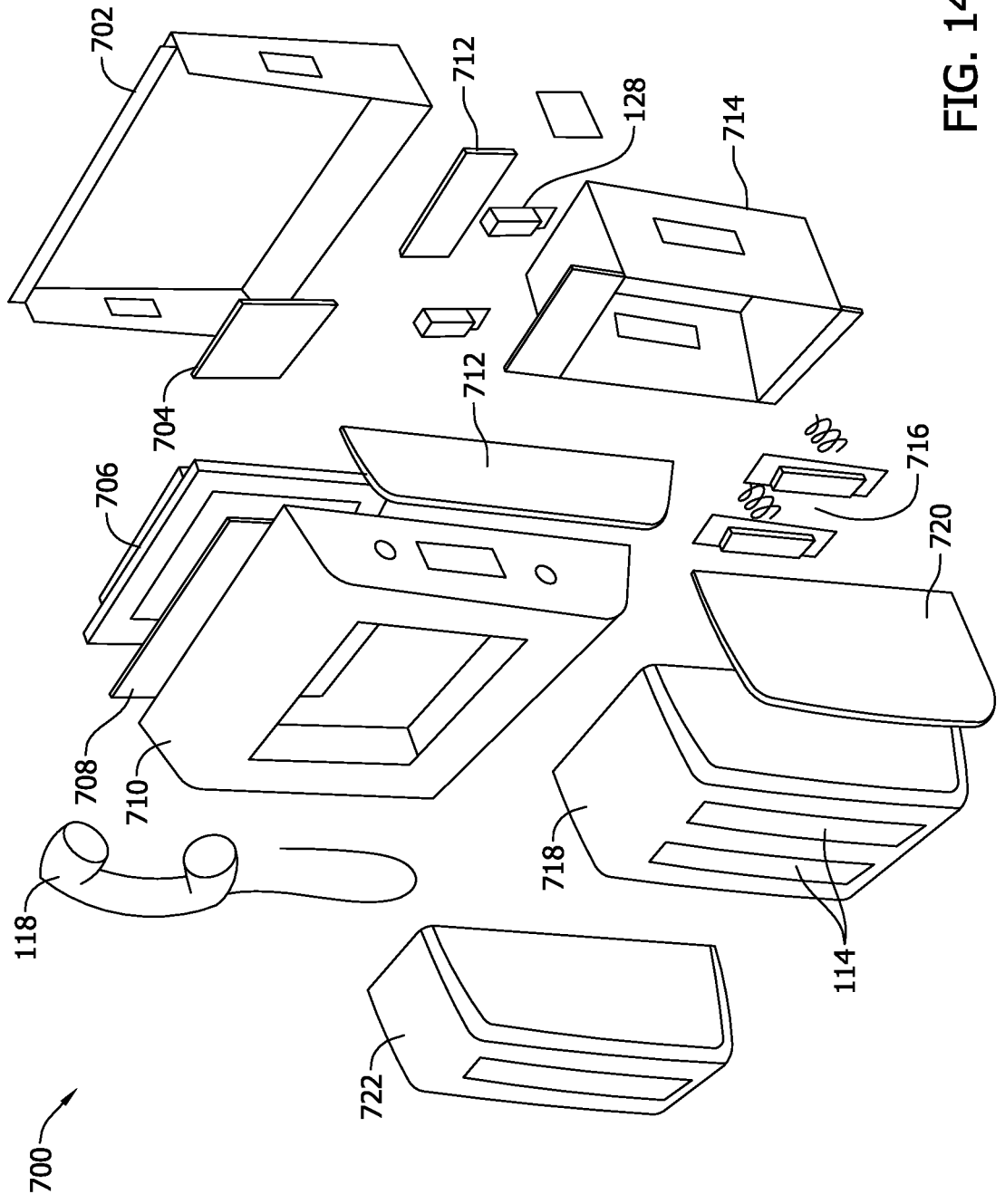
FIG. 14 is an exploded view of a third exemplary embodiment of a configurable correctional facility computer kiosk system featuring a main kiosk device assembly and a modular charging bay assembly for a number of portable computing devices such as tablet computer devices.

FIG. 14 is an exploded view of a third exemplary embodiment of a configurable correctional facility computer kiosk system 700. The kiosk system 700 features a main kiosk assembly and modular charging bay assembles for portable computing devices such as tablet computer devices.

In lieu of the backplate 520 (FIG. 8), the main kiosk assembly in the system 700 includes a rear chassis 702 that is configured for mounting to a wall using screws or wall anchors. Power supply wires are extended through the rear wall 702 and connect to a main circuit board 704. The main circuit board is, in turn, connected to main kiosk computing equipment 706 such as a kiosk display and central processing unit (CPU) therefore. The computing equipment 706 is covered by protective glass 708 and is enclosed in a main kiosk housing 710 that may include modular side panels 712 similar to those described above to provide a closed end panel or a handset panel for the handset 118 on either side of the main kiosk housing 710.

As also shown in FIG. 14, the main circuit board 704 also connects to a circuit board 712 of a modular charging bay that further includes a chassis configured to be wall mounted alongside the main housing 710, locking elements 128, and spring loaded ejector pads 716 that release a tablet computer device when unlocked, and a charging bay housing 720 that defines tablet charging slots 114 to accept a tablet computer device. The charging bay housing 720 also includes modular side panels 720, and multiple charging bays may be attached to the main housing to expand the number of tablet charging slots 114. FIG. 14 shows a single slot charging bay housing 722 in addition to a dual slot charging bay housing 718.

While structured a bit differently than the kiosk system 500 the flexibility and cost savings of the modular assemblies in the kiosk system 700 confer similar benefits. Also, the algorithmic processes performed and related functionally when executed by the processor-based devices in the system 700, as well as the related benefits thereof, are similar to those described above for the computer kiosk systems 100 and 500.

Figure 15:
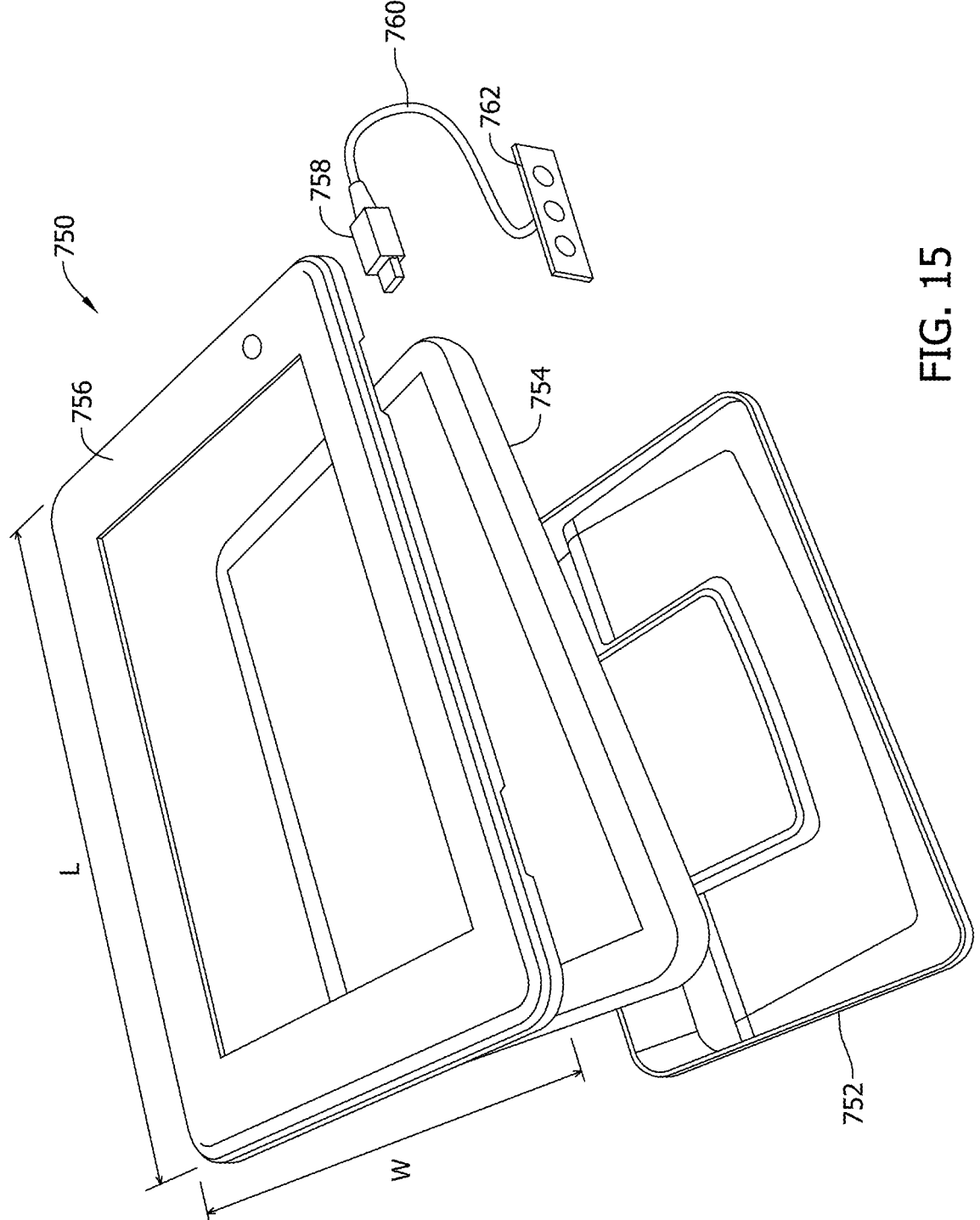
FIG. 15 is an exploded view of a first exemplary embodiment of a portable electronic device assembly to be used with the kiosk systems shown in FIGS. 5 and 12.
Figure 16:
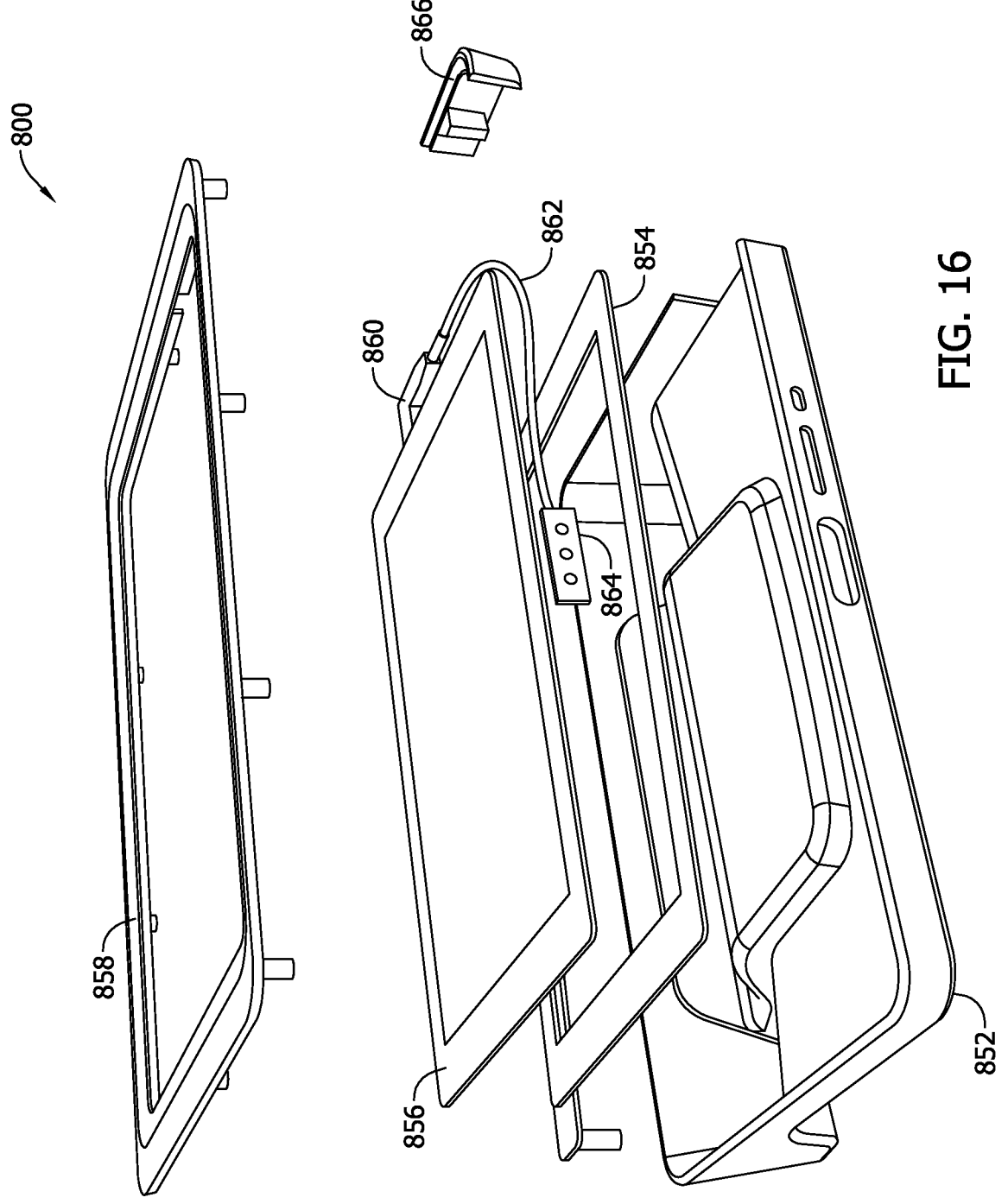
FIG. 16 is an exploded view of a second exemplary embodiment of a portable electronic device assembly to be used with the kiosk systems shown in FIGS. 5 and 12.
Figures 17, 18:
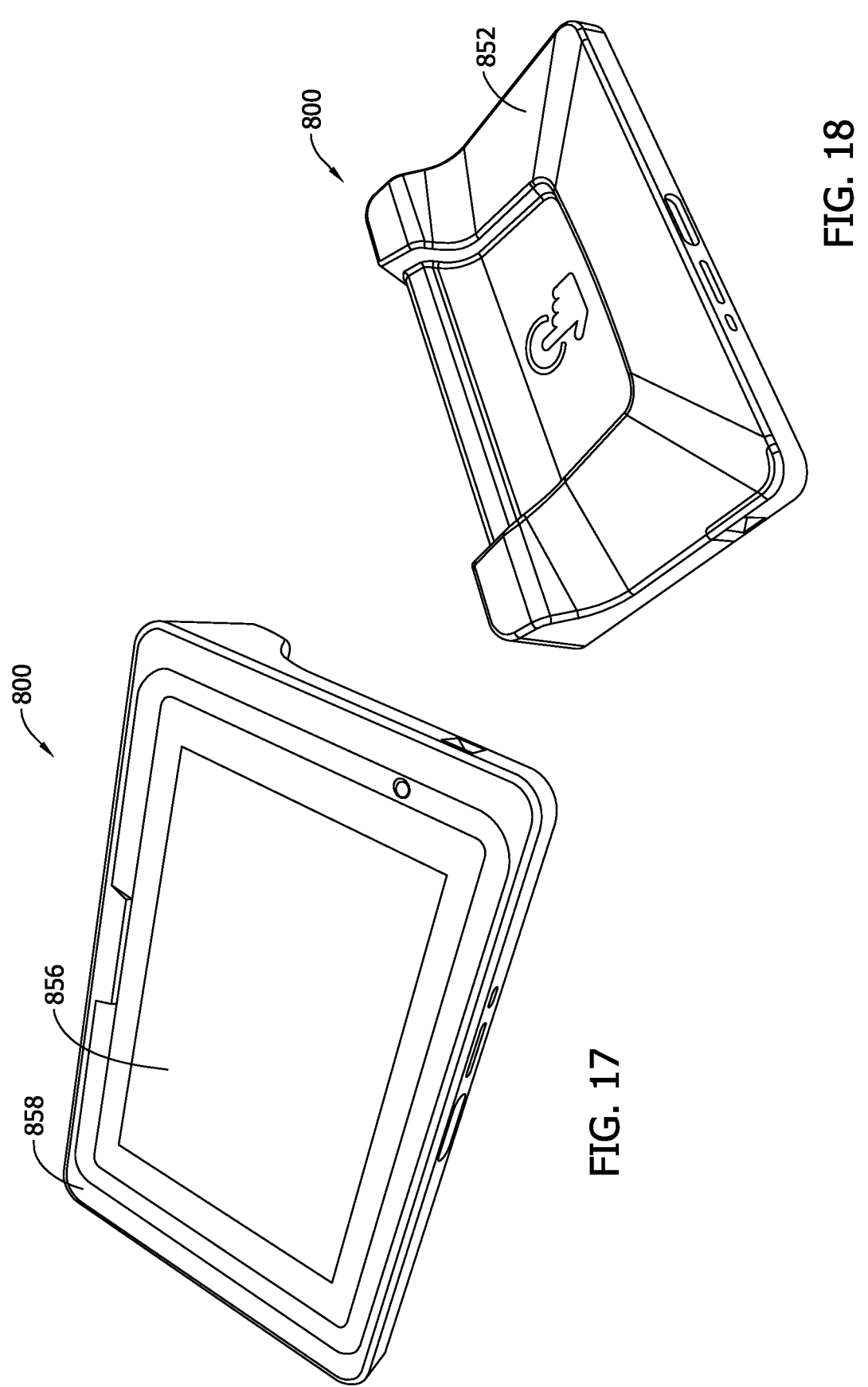
FIG. 17 is a top perspective view of the portable electronic device assembly shown in FIG. 16.
FIG. 18 is a bottom perspective view of the portable electronic device assembly shown in FIG. 16.

FIG. 15 illustrates a tablet computer device assembly 750 adapted for use with one of the kiosk systems 100, 500 or 700. The assembly 750 includes a lower housing 752, a tablet computer device 754 and an upper housing 756. The upper housing 756 is secured to the lower housing 752 with the tablet computer device 754 captured in between. The housings 752, 756 may be fabricated from heavy duty materials appropriate for correctional facility use. Tamper proof fasteners such as a tamper proof screws may be utilized to prevent the assembly 750 from being taken apart.

The tablet computer device 754 may include similar features as the tablet computer device 200 described above, but does not itself include any type of integrated stand or external support for use. Instead, support and stand features are built-in to the lower housing 752 that is separately provided and assembled to the tablet computer device. The tablet computer device 754 may therefore have a simpler form factor akin to conventional off-the-shelf tablet computer devices. The tablet computer device 754 is also fully functional and safe for use apart from the upper and lower housings 752, 756 in the assembly. That is, the tablet computer device 754 is prefabricated to include its own housing protecting the display and CPU, microphone, speaker(s) etc., and fully provided with accessible on/off switches or controls, volume buttons or controls, an optional headphone jack, and a charging/data communication port such as a USB port, micro-USB port, or lightning port of an IOS device.

The assembly 750 including the fully functional tablet computer device 754 is sometimes referred to herein as a hybrid solution that adapts an otherwise conventional form factor of a tablet computer device to one that is compatible with the kiosk system 100, 500 or 700. Toward this goal, the hybrid assembly 750 also includes a charging connector 758, a cable 760 and a docking connector 762 that is compatible with a mating docking connector in a modular charging bay so that the tablet computing device 754 may receive charging power and also may be identified by the modular charging bay or the main kiosk assembly for the tablet check-in and check-out processes such as those described above.

The docking connector 762 may be fixed in location in the assembly 750 and is accessible from an exterior thereof, such that when the assembly 750 is inserted into a tablet computer slot 114, alignment between the docking connector 762 and a mating docking connector in the modular charging bay is ensured. When the assembly 750 is fully inserted into the tablet computer slot 114, the mating of the connectors occurs with plug and socket-type engagement. In the example shown in FIG. 15, the charging port on the tablet computer device 754 is located on the right side of the device 754, while the docking connector 762 is located on the bottom edge of the assembly 750. The relocation of the charging port, via the docking connector 762, from the shorter side of the device 754 to the longer side of the assembly 750 allows the assembly to be inserted into a tablet charging slot 114 widthwise instead of lengthwise so that the reduced width dimension is inserted into the slot rather than the longer length dimension. That is, the assembly 750 is inserted into the tablet charging slot 114 in a charger bay in a direction parallel to the width dimension W in FIG. 15, as opposed to a direction parallel to the length dimension L in FIG. 15. Accordingly, the tablet computer slots 114 need not be as deep, or the corresponding width dimension $W_2$ (FIG. 7) in the charging bay may be reduced from what it may otherwise need to be if the assembly 750 was inserted lengthwise.

The circuit board in the modular charging bay may therefore, by virtue of the docking connector 762, identify the connected assembly 750, assess a state of battery charge in the tablet computer device 754, and enable the functionality described herein to manage the device 754 in aspects of device charging and other aspects needed by a secure correctional facility environment. In other embodiments wherein the device does not include a charging port or data port, the charging bays may include transmitters or receivers that may communicate with the tablet device 754 for identification purposes, and wireless charging (e.g., inductive charging) may be utilized in the charging bays.

Locking features may also be incorporated in the assembly 750 and/or in the charging bays to permit or deny access to the assembly 750 as described above.

FIG. 16-19 illustrate a custom-fabricated tablet computer device assembly 800 to be used with the kiosk system 100, 500 or 700 described above. The tablet compute device assembly 800 includes as shown a lower housing 852, a chassis 854, tablet electronics 856 and an upper bezel 858 that may all be secured to another in a tamper-proof manner.

The tablet electronics 856 may include the touch screen display, CPU, device memory, microphone, camera, speaker, and wired or wireless data and communication components, or any other features needed to function as described herein. Unlike the assembly 750 described above, the electronics 856 are not prefabricated with a built-in housing, and instead the chassis 854, lower housing 852 and bezel define the housing and support structure for the electronics 758. The assembly 800 likewise includes a charging/data connector 860, a cable 862 and a docking connector 864 that is fixed in location on the longer side of the assembly 800.

Figure 19:
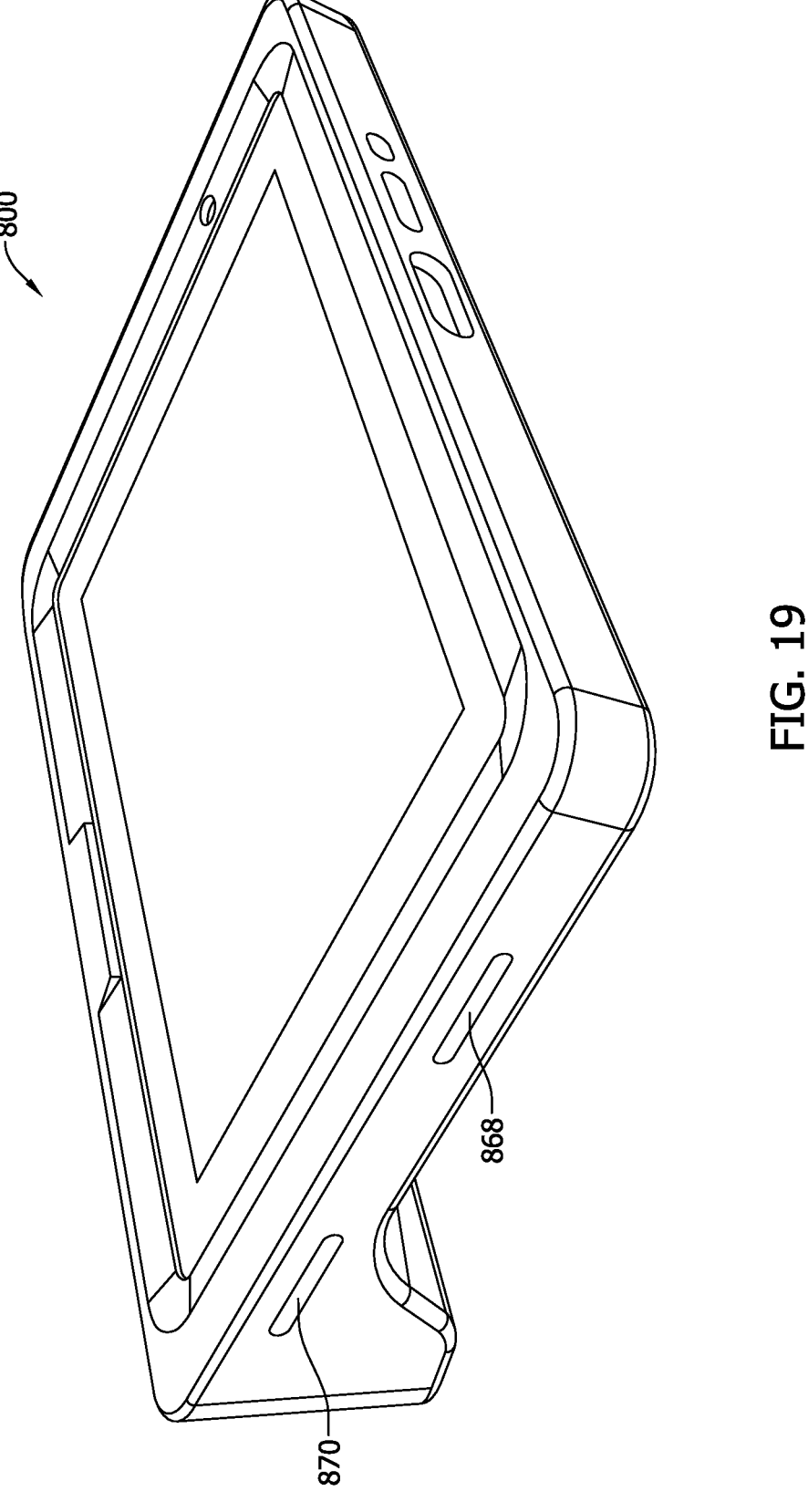
FIG. 19 is a side perspective view of the portable electronic device assembly shown in FIG. 16.

A locking insert 866 is further assembled to and is located in between the lower housing 852 and the upper bezel 858, and cooperates with locking features in the modular charging bay to allow or prevent access to the assembly 850 via the computer kiosk system. Openings are provided in the lower housing 852 as shown to provide access to the docking connector 865, volume controls and on/off controls for the electronics 856 for use when the assembly 800 is removed from the kiosk system. Additionally, the lower housing 852 is shaped and contoured to provide a built-in stand feature to support the screen display of the electronics at an inclined position on a tabletop or other support surface. Of course, alternative shapes and geometries are possible. Side mounted speaker ports 868, 870 are also provided as shown in FIG. 19, although it is appreciated that speaker ports could be located elsewhere in the assembly 800 in another embodiment.

While structured a bit differently, the benefits and advantages of the two assemblies 750 and 800 are similar insofar as the computer kiosk system is concerned.

FIGS. 20 through 28 illustrate aspects of monitoring the computer kiosk system operation and tablet computer device operation in the systems 100, 500 and 700 described above, which may involve the tablet computer device assemblies 200, 750 or 800 described above. Specifically, FIGS. 20-28 illustrate graphical user interface screen displays in the form of screen shots that may be accessed by system administrators of, for example, the kiosk services system 300 (FIG. 3) or by a correctional facility overseer/administrator via an administrative device 308, 310, 312, 314 (FIG. 3). The screen displays include graphical menu-driven selections, searchable fields, selectable buttons, data entry fields, and the like to facilitate administrative user interaction with a computer kiosk system or multiple computer kiosk systems in the same or different correctional facilities. Using the screen displays provided in the user interfaces, administrators may set up or initialize the computer kiosk system(s) by enrolling users and tablet computer devices, select user preferences for the management of tablet computer devices, review status and usage of tablet computer device assemblies over time, update tablet computer devices and take corrective actions as needed, as well as generate reports for review and study to assess computer kiosk system performance across a plurality of computer kiosk systems in the same or different facility.

FIG. 20 illustrates a first administrative user interface graphical screen display 900 including the monitored status of a plurality of tablet computer device assemblies associated with computer kiosk systems such as those described above. As shown in FIG. 20, the Device tab has been selected on the interface screen display, and additional tabs including a general Dashboard tab, a Users tab, an Apps tab, a Facilities tab, a Reports tab and a Support tab are provided that each present respectively different screen displays when selected.

As seen in FIG. 20, the tablet computer devices and status information in the display 900 may include device name, device user, device uptime, device status, group, and firmware version. Any of the listed tablet devices may be selected and additional information for the selected device may be displayed such as app version, battery charge and estimated working time of the selected device in view of the same, memory allocation for the selected device, a find device alarm option, and an option to block or unblock the device for use. As such, if a tablet computer device is lost or unaccounted for, it can be blocked and taken offline from a centralized remote location, effectively disabling it for use. The display 900 also includes option to search for device by name or by facility, and an option to schedule auto-updates for device software.

As shown in the pop-up window in FIG. 20, the administrator may commission a tablet computer device in a "Safe mode" setting for use by an inmate user wherein certain options or types of use of the tablet computer device are restricted or unavailable for certain inmate users. The Safe mode can be turned on and off via the dashboard 900 as needed or as desired to provide the desired security for different users in a flexible manner such that the same tablet device may be used in safe mode (or not) depending on administrator need or preference. In some embodiments, some of the tablet computer devices can be designated for use by correctional facility administrators and therefore do not have the same types of restrictions on "Safe mode" operation or other types of use, but the tablet computer devices can nonetheless be tracked and monitored by the computer kiosk system in charging aspects and in other aspects even though the tablet computer devices are used by facility administrators.

FIG. 21 illustrates an exemplary software scheduling update display 950 for tablet computer device assemblies associated with computer kiosk systems such as those described above. The display 950 is available in the Device tab and the Schedule Update button presented thereon. The information listed for each tablet computer device is the same as that shown in FIG. 20, but as shown in the pop-up window in FIG. 21, the administrator may see the oldest installed software versions and whether updates are needed, and schedule any desired software updates for all tablet computer devices, groups of tablet computer devices or for specifically selected tablet computer devices. The administrator may also select a next software update date and preferred time for the next update. Tablet computer devices may therefore be automatically updated through the dashboard 950 instead of individually through each tablet computer device. Platform/firmware updates for individual tablet computer devices or groups of tablet computer devices are likewise possible. Global changes and updates may also be pushed to all tablet devices as needed or as desired.

In contemplated embodiments, software updates may performed while the tablet computer devices are not in use (e.g., in a standby state while charging or while still in one of the charging bays of the kiosk system described) in order to not interrupt users who have checked out a tablet computer device for a limited time and possibly subject to charges for use of the tablet computer device that may be interrupted by a software update. As such, software updates may occur device-by-device at the next available standby state for each tablet computer device that follows the scheduled update. Software updates need not be scheduled overnight or at a time when no tablet computer device is made available for use. For devices in use when a software update is commissioned, the tablet computer devices will be updated when returned to the computer kiosk system, and for certain types of updates no scheduling of an update date or time is actually required. When the devices are docked in the computer kiosk system for charging the software on the device can be confirmed and any updates needed can be made while the tablet computer devices are being charged and before the tablet computer devices can be checked out again to another authorized user.

FIG. 22 illustrates an exemplary correctional facility dashboard display 1000 for tablet computer device assemblies associated with computer kiosk systems such as those described above. The dashboard display 1000 is available via the Dashboard tab and includes summary information such as total devices, total users, facilities monitored, online devices, blocked devices, and new alerts. Graphical bar charts for online devices, and pie charts for device status (online or offline/blocked), total users (inmate users, facility admin users, and kiosk services admins), and a graphical plot of hacking attempts in a selected time period are presented so that an administrator may quickly assess the system usage and improper use of tablet computer devices detected in the selected timeframe. Such reports may be archived and saved for future study or reporting and such reports may be produced on demand by an administrator in desired timeframes.

In contemplated embodiments, a correctional facility administrator may conveniently see and review the actual number of tablet computer devices made available and the actual number of authorized users in the correctional facility.

Of the tablet computer devices made available through the computer kiosk system(s) in the correctional facility, the administrator may also conveniently see and review at any given point in time how many of them are active and in use, how many of them are online, how many of them are offline, and how many of them have been blocked by an administrator and cannot be used. The correctional facility administrator(s) having access to such information may therefore easily understand actual system usage and issues presented thereby as well as needs to reconfigure to the computer kiosk system(s) to accommodate additional tablet computer devices in view of changing needs of the facility.

FIG. 23 illustrates an exemplary malicious activity display 1050 for tablet computer device assemblies associated with computer kiosk systems such as those described above. The display 1050 may be accessed via the Devices tab on the top of the user interface. The information listed for each device is the same as that shown in FIG. 19, but as shown in the pop-up window in FIG. 23, the administrator may choose to block a selected device and identify a reason for doing so, including a detected hacking event, detected suspicious activity, a lost device, or an administrator defined "other" reason. When selected devices are blocked, the information is saved and archived and reported via the dashboard 1000 and the status is updated in the dashboards 900 and 950.

In contemplated embodiments, a hacking attempt may be detected via an unusual use or pattern of use of a tablet computer device. For example only, an attempted use of multiple keys on a keyboard (e.g., combinations of ctrl keys and other keys), repeated attempts to use multiple keys in combination or a in a certain order, or excessive use of a touch screen may be deemed to constitute a hacking attempt that can be flagged by the system. Such detected use of combinations of keys or repeated order of keys can indicate a user attempt to activate a factory reset, attempted activation of a safe mode operation, or an attempt to access other unauthorized features or to disable security features. Likewise, excessive use of a touch screen can be measured by the number of touches in a predetermined and relatively short time period, and therefore detect a user that is attempting to crash an app by repeatedly hitting the touch screen and achieving a possible automatic reset of the app or the device that could present an opportunity to circumvent system security. However detected, such hacking attempts may be deemed red flag events that cause the system to generate alerts or alarms that may permit administrators the chance to proactively respond by blocking affected tablet computer devices in more or less real time.

Figure 24:
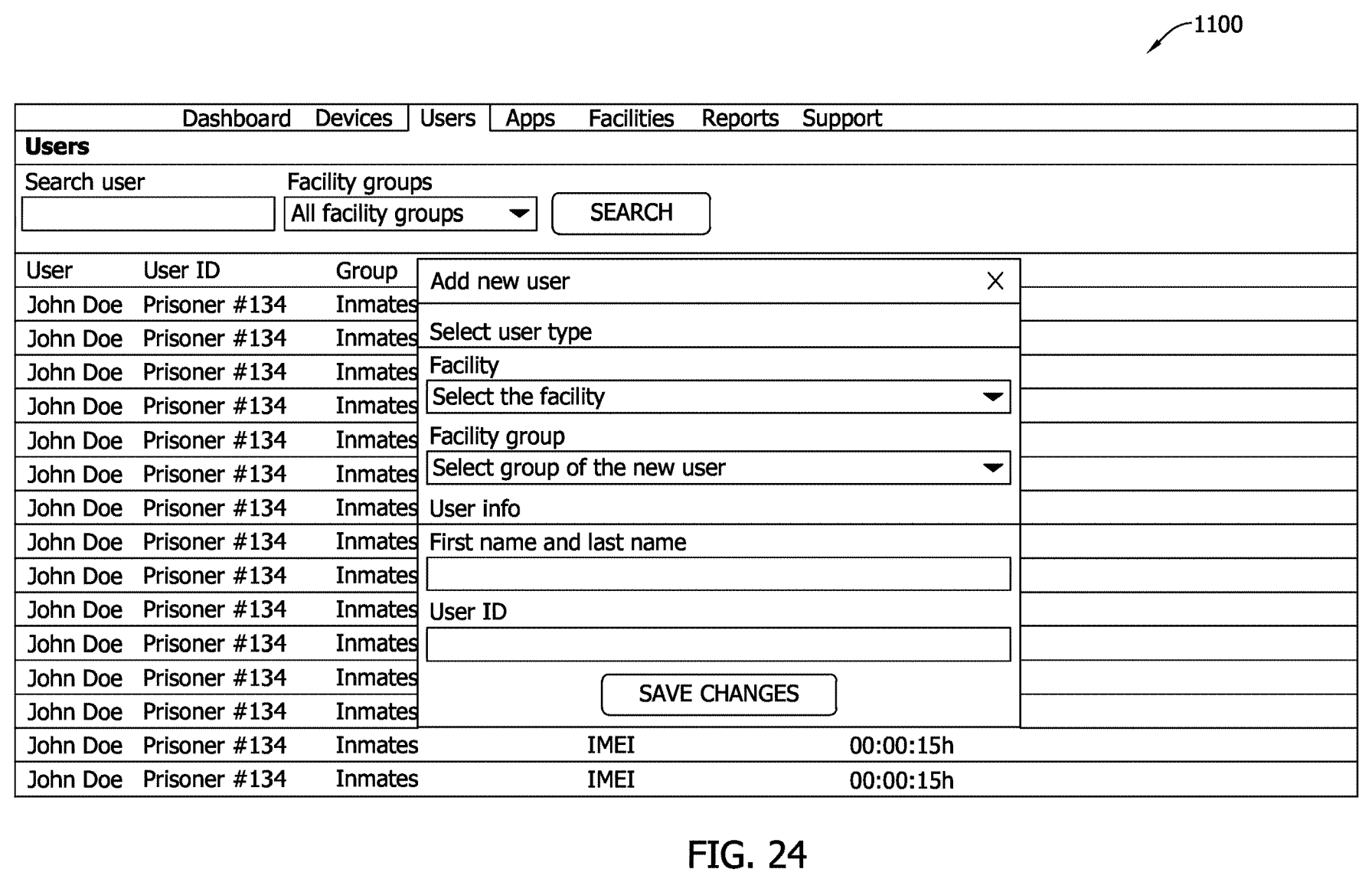

FIG. 24 illustrates an exemplary enrollment display 1100 for check-in and check-out procedures of tablet computer device assemblies associated with kiosk systems such as those described above. Inmate users, and administrator users, may be manually or automatically enrolled for purposes of the kiosk system to authorize a check-out of a tablet computer device from the kiosk system. As shown in the pop-up window in FIG. 24, options to select a facility or facility group are presented as well as for user name and user ID to be entered manually. Pre-populated batches of user names and user IDs may be imported or downloaded from a correctional facility system or database in an auto-enrollment process, or pre-populated groups of batches of user names and user IDs that may be updated over time may be imported or downloaded from a correctional facility system in an auto-enrollment process. In contemplated embodiments, the pre-populated groups may represent inmates having different offender status that may affect their ability to access tablet computer devices at all or that may affect the restrictions imposed on such use of tablet computer devices. Pre-populated batches of user data may also include facility administrator user data for persons having different levels of authority and responsibility for the correctional facility. Administrative users may be able to check-out tablet computer devices assemblies that inmate users may not, or administrator users may use tablet computer devices in ways that other users cannot via permissions granted or denied through the computer kiosk system.

While auto-enrollment of users is desirable to initially set up a kiosk system or update user enrollment in less time and with less effort by using data and information that the correctional facility already tracks and updates for other purposes, manual enrollment is also possible and the graphical user interface will preferably allow both auto and manual enrollment to performed.

Device enrollment is also required in contemplated embodiments so that the kiosk systems can identify, track and/or manage the tablet computer devices which are utilized with the kiosk systems. In various embodiments, device enrollment may include over-the-air (OTA) device enrollment, a registration of devices based on ownership of the devices, enterprise-level bulk enrollment via for example Samsung Knox Mobile Enrollment (KME) and Android Near Field Communication (NFC) enrollment techniques, or other forms of enrollment allowing devices to be identified, managed and reported by the kiosk system.

Device enrollment and user enrollment may facilitate profile creation and corresponding profile management of devices to create and enforce policies and restrictions for the same or different facilities or across multiple facilities. Profile creation and corresponding profile management may also be utilized to configure Active Directory (AD) policy settings to access enterprise resources; to restrict the use of camera, Bluetooth, browser, and more for increased security; and/or to segregate Android devices based on whether they are corporate devices or personally owned bring your own device (BYOD) enrolled on the system, and to apply appropriate policies and restrictions. Further profiles may be created for similar purposes relating to IOS devices as desired to realize similar functionality.

Once tablet computer devices and users are enrolled, the kiosk system may implement authentication procedures including a single sign in and/or the user's Active Directory (AD) credentials. Multiple devices may be enrolled for the same user in contemplated embodiments.

Figure 25:
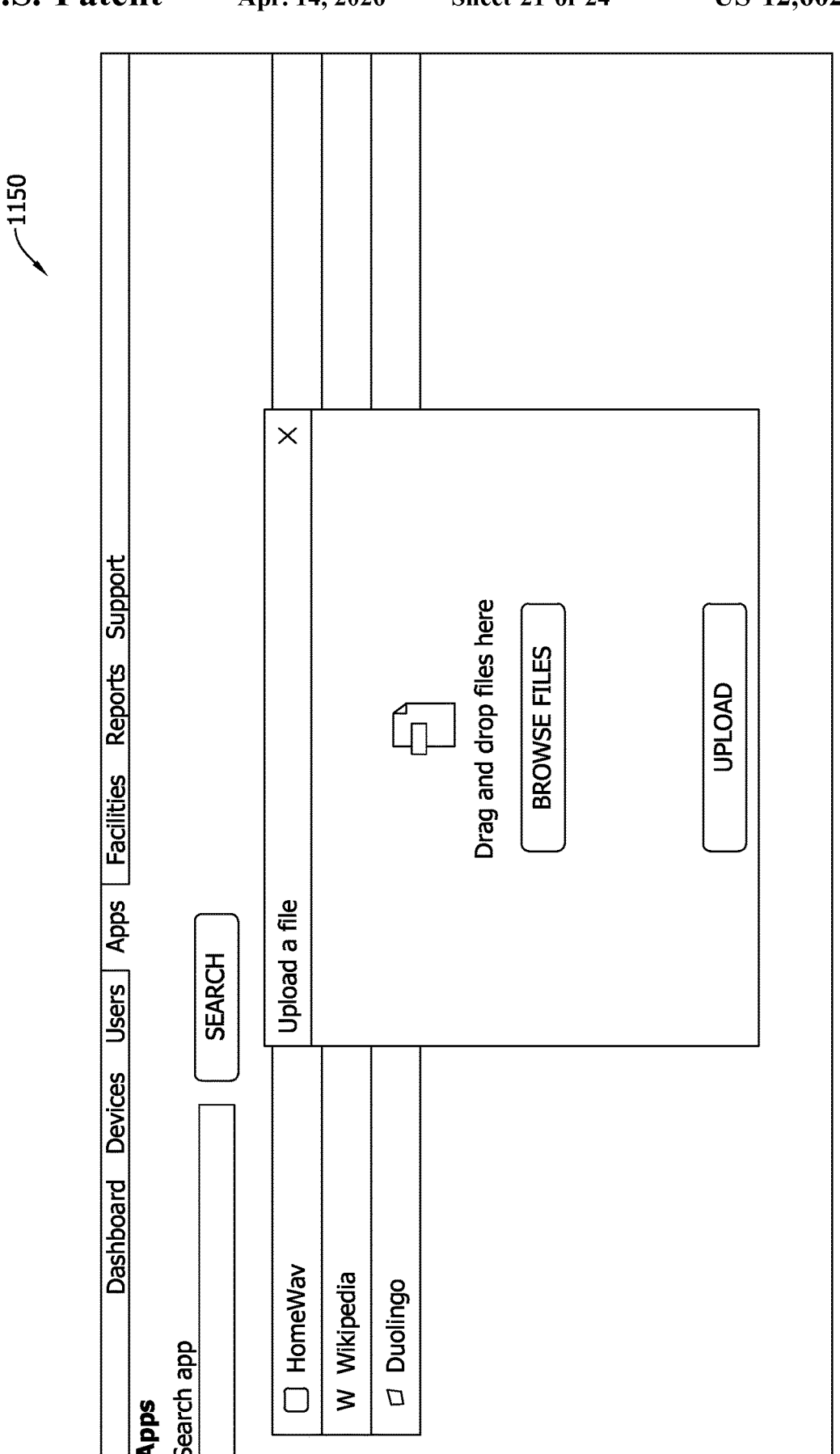
FIG. 25 illustrates an exemplary administrative user interface graphical screen display for app management in the portable electronic device assemblies of FIGS. 2, 15 and 16 that are utilized with the kiosk systems of FIGS. 1-3, 5 and 14.

FIG. 25 illustrates an exemplary app (e.g., Android Package or APK) management display 1150 for tablet computer device assemblies associated with kiosk systems such as those described above. Apps may searched by name and may be uploaded through the dashboard 1150, or preapproved apps may be selected that may be made available to users of tablet computer devices as desired. Apps may likewise be searched by name, or preapproved apps may be selected that may be uninstalled from tablet computer devices and therefore not made available to users of tablet computer devices as desired. Flexibility is therefore provided to allow or disallow apps over time as needs change or to accommodate different types of users via a single dashboard, while eliminating any need to individually add or remove apps to each tablet computer device.

App management features that are also implemented in the kiosk systems described include management and distribution of in-house and Play Store apps; reporting to monitor the status of apps installed on the respective devices; publishing of apps on an app catalog for enrolled users to choose and install by themselves; blacklisting of apps not approved by the organization to prevent usage and/or installation of selected apps; grouping of users and/or tablet computer devices to control app access to different groups and ALL groups at same time; and ability to see and review the current app status of tablet computer devices.

In contemplated embodiments, administrators will be able to easily drop an apk to the app list of the facility and install a new app on all tablets for that particular facility. Based on the update schedule, all tablets will see the new app on their application center and will receive the app at the scheduled time or if the device is in use at the scheduled time, at the next available time when the tablet computer device is returned to the kiosk system to avoid interruption in use of the device while checked out.

FIG. 26 illustrates an exemplary device status display 1200 for tablet computer device assemblies associated with kiosk systems such as those described above. The information listed for each tablet computer device is the same as that shown and described above in FIGS. 20 and 21, and the options in the pop-up windows in FIGS. 20 and 21 can be selected from the dashboard 1200. Beneficially, administrators are able to monitor tablet resources including, cpu usage, storage and memory allocation, device uptime and available battery charge, and software version information for each tablet made available through the kiosk system. Information can be compared amongst the tablet computer devices being monitored by groups or individually to assess system performance overall as well as assess performance issues with tablets themselves that can be analyzed, investigated, and resolved via the interfaces provided in a manner that is transparent to the end users of the kiosks.

Figure 27:
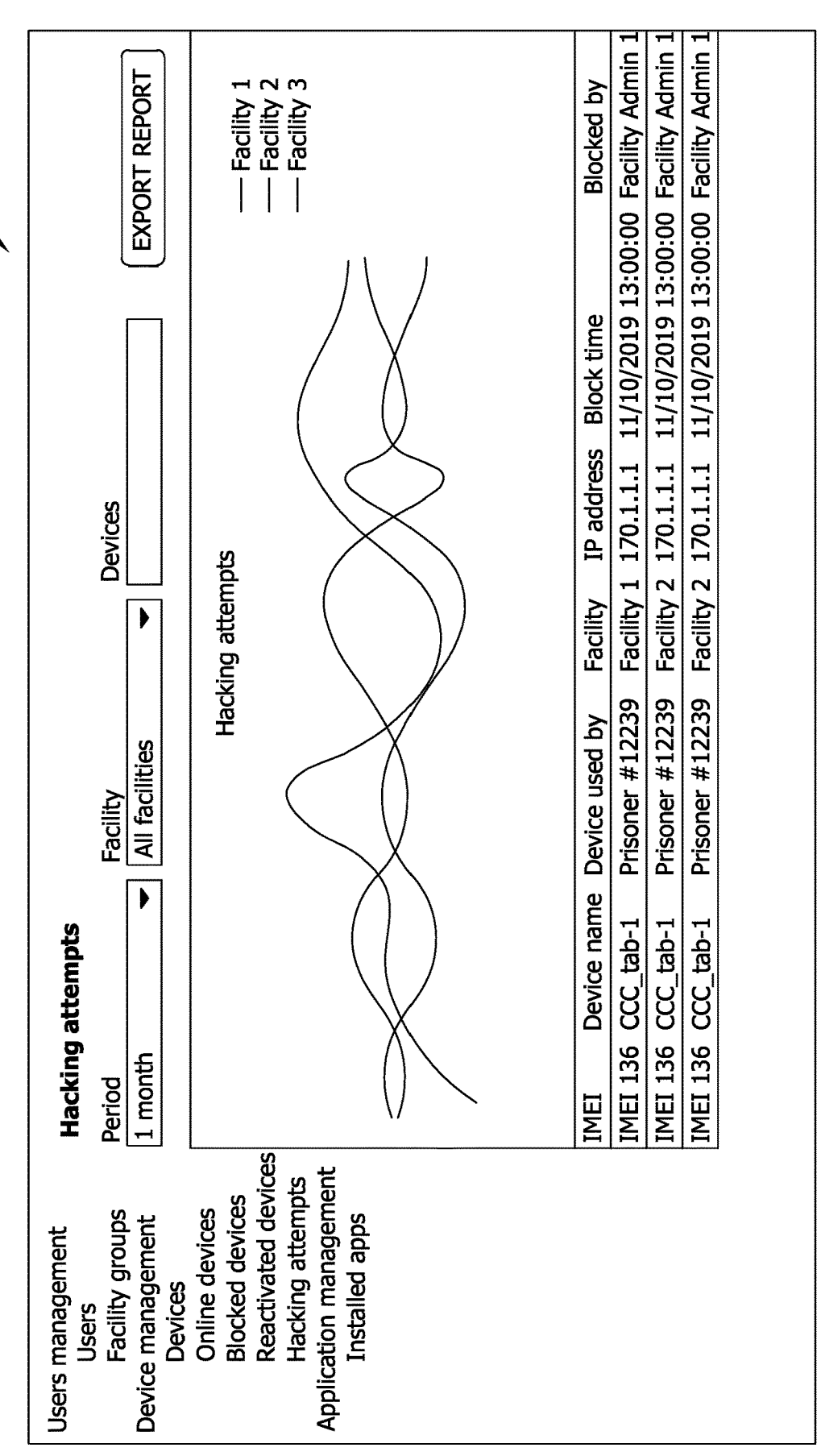
FIG. 27 illustrates an exemplary administrative user interface graphical screen display graphical screen display hacking report for the portable electronic device assemblies of FIGS. 2, 15 and 16 that are utilized with the kiosk systems of FIGS. 1-3, 5 and 14.

FIG. 27 illustrates an exemplary attempted hacking report display 1250 for tablet computer device assemblies associated with kiosk systems such as those described above. Hacking attempts are plotted over a selected timeframe, and tablet computer devices are listed that have been blocked including device name, device user, facility information, IP address, block time, and administrator ID responsible for blocking the device. The reports may be exported for further evaluation, study or recordkeeping purposes.

At the left hand side of the display 1250, the menu includes selectable user management options of users and facility groups, and selection of either one will produce additional user info and facility group info. Selectable device management options are also provided including devices, online devices, blocked devices, reactivated devices (i.e., devices that have been unblocked), and hacking attempts. Selection of the respective device management options will produce additional information and screen displays.

Additional security measures that may be implemented in the kiosk systems include customized device passcodes, from simple to complicated, according to the needs of the correctional facility; ability to remotely lock tablet computer devices when needed; ability to activate remote alarms and procedures to identify any lost devices or devices that are not accounted for or otherwise take correction action; ability to perform remote wipe procedures for selected features to prevent data loss or theft; and ability to perform corporate wipe procedures to erase confidential corporate data such as e-mails, documents etc.

Additionally, customized toolbars may be created for device use and controls such as for example allowing volume buttons only in the toolbar, wherein the toolbar that includes the volume controls may be remotely enabled or disabled. Safe mode in each tablet computer device may also be enabled or disabled remotely, and factory reset for selected tablet computer devices may likewise be remotely enabled or disabled for use by selected users only (e.g., administrators may be allowed to reset a device but an inmate may not). Audits and reports may be made available to selected users only (e.g., selected administrators only that have at least a minimum level of oversight responsibility). Assertive monitoring by device type may be implemented such as generating updated reports on the status of Android devices. Customized reports may be generated based on criteria such as apps by devices, devices by model, etc. to facilitate a granular review of different devices presenting different issues.

Figure 28:
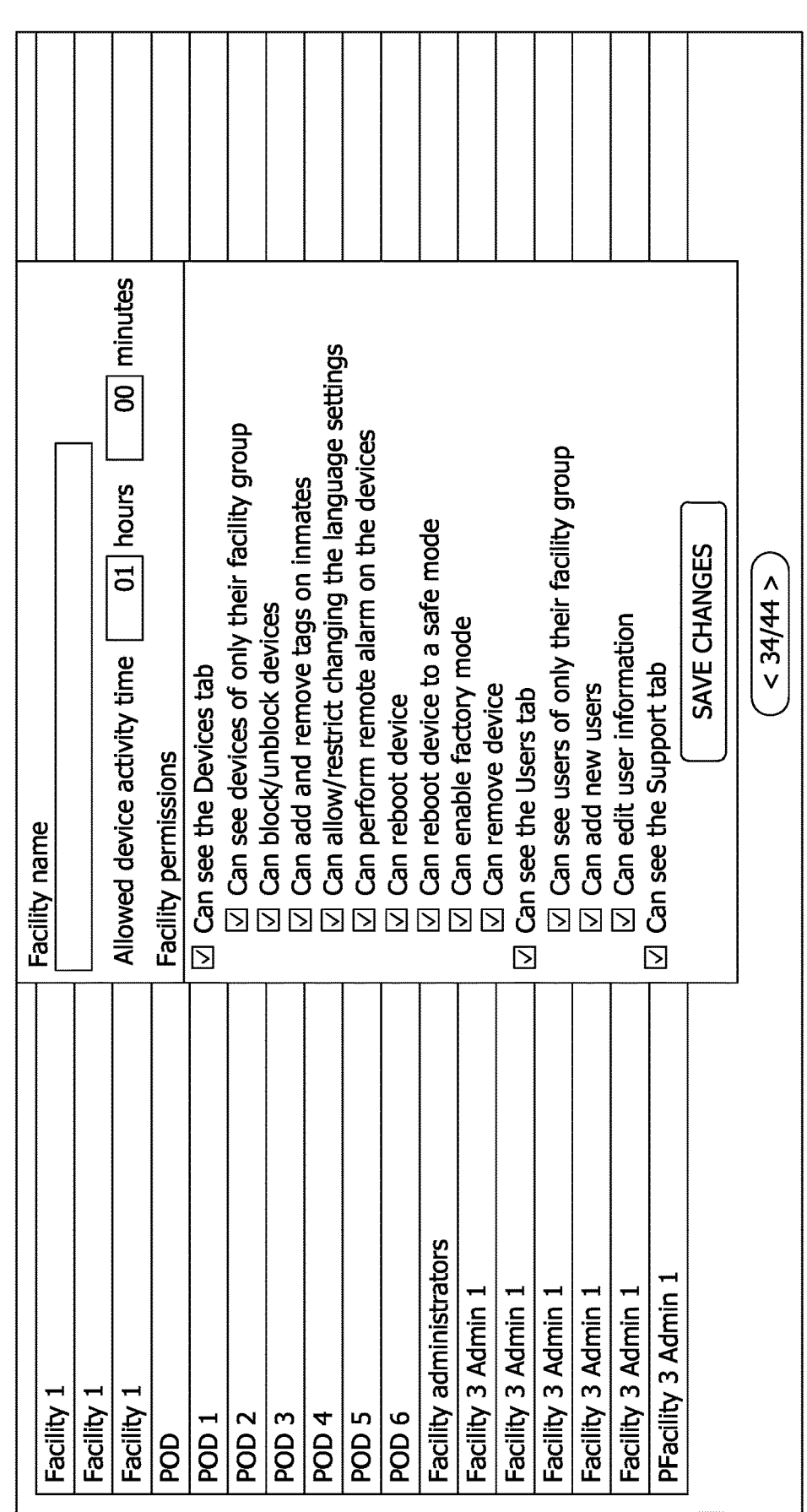
FIG. 28 illustrates an exemplary administrative user interface graphical screen display for administrative management of the portable electronic devices of FIGS. 2, 15 and 16 that are utilized with the kiosk systems of FIGS. 1-3, 5 and 14.

FIG. 28 illustrates an exemplary administrator display 1300 for tablet computer device assemblies associated with kiosk systems such as those described above. The display allows correctional facility administrator actions in selected facilities to be given permission to see certain tabs and information available in the dashboards above, or to take (or be prevented from taking) selected actions such as those shown in the pop-up window, including but not limited to blocking or unblocking of devices, adding or removing inmate tags, allowing or restricting language settings for use of the tablet computer devices, actuating alarm features, rebooting tablet computer devices, changing devices to safe mode operation, resetting devices to factory default settings, adding new users, or editing user information.

The administrative user interfaces described above may be customized facility-by-facility via adding or removing designated features to flexibly meet the needs and preferences of a spectrum of correctional facilities.

Features described above in relation to the user interface displays and features described above may be implemented in algorithmic form in certain steps described above in relation to FIG. 4, or in new steps to those described in relation to FIG. 4.

Effective management of large numbers of tablet computer devices made available to large numbers of correctional facility users (inmates and administrators) from the same or different computer kiosk systems may be realized via the administrator user interfaces including the displays described above from a centralized location. Such tablet computer device management at the centralized location practically eliminates otherwise substantial burdens in administrating tablet computer devices on an individual basis. Administrative burdens and barriers to the use of tablet computer devices in correctional facilities are minimized and overcome from the perspective of restricting access to authorized users, managing battery charging in the devices, updating software for the devices, monitoring device usage, taking corrective actions when needed from a remote location, detecting suspicious or malicious activity of system users, and setting user and device system setting preferences across groups of users and devices.

In some embodiments, the centralized management of all tablet computer devices associated with a computer kiosk system is realized via a management server to which all of the devices are connected. As such, all of the devices monitored may communicate with the server and vice versa, and the administrator interface and displays compile information gathered via the server for actions to be taken or for system setting preferences to be executed. The administrator interface including displays such as those described may be implemented as a web-based, hosted service for correctional facility administrators and kiosk service system administrators. Data and information supplied to or collected from the server may be compiled and stored in system databases, which in turn are made accessible to the administrator interface.

Device communication with the server may established through the kiosk system(s) when the tablet computer devices are received in the tablet charging slots, as well as when the tablet computer devices are removed from the kiosk system. Accurate, real-time monitoring of each individual tablet computer device (battery percentage, memory allocation, and specific use) is possible from a remote centralized location, and monitored data and information can be displayed or reported to administrators individually or in groups via the displays described. Further, and through the server, specific actions may be taken with respect to selected devices only as described above (e.g., locking or unlocking, or blocking or unblocking). In some embodiments, the centralized monitoring and flexibility of the administrator user interface for a user to take certain actions (or not) to manage devices can be shared amongst kiosks system administrators and correctional facility administrators.

The flexibility of the user interfaces described, coupled with the flexibility of the kiosk systems to be reconfigured and expanded to meet changing needs of correctional facilities and to accommodate different form factors of tablet computer devices, beneficially realizes a relatively low cost solution to longstanding but unfilled needs in the marketplace.

The above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the embodiments described above. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Such computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

The applications described above are flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described. Each component and process can also be used in combination with other assembly packages and processes.

One or more computer-readable storage media may include computer-executable instructions embodied thereon for interfacing with the kiosk systems and tablet computer devices described. The kiosk systems and the tablet computer devices may each include a memory device and a processor in communication with the memory device, and when executed by the processor in each respective device the computer-executable instructions may cause the processor to perform one or more algorithmic steps of a method such as the method described and illustrated in the example of FIG. 4.

Having described devices and applicable operating algorithms functionally per the description above, those in the art may accordingly implement the algorithms via programming of the controllers, servers or other processor-based computing devices. Such programming or implementation of the concepts described is believed to be within the purview of those in the art and will not be described further.

The benefits and advantages of the inventive kiosk systems, assemblies, algorithms and user interfaces described are now believed to have been amply illustrated in relation to the exemplary embodiments disclosed. Barriers to adoption of tablet computer devices in correctional facilities are obviated, and inmates may more readily enjoy the enhanced user experience of tablet computer devices without burdening facility administrators or compromising security safeguards. Technological solutions to significant technological problems are provided via the inventive kiosk devices, systems and methods described including hardware and software configurability and intelligent management of an inventory of a number of tablet computer devices and different sizes of tablet computer devices in a single system realized by an assembly of prefabricated modular component assemblies.

An embodiment of a configurable computer kiosk system for securely managing access to an inventory of portable electronic devices to a pre-registered population of users has been disclosed. The configurable computer kiosk system includes a main kiosk assembly configured to accept unique login information from any of the pre-registered population of users, and a selected number n of modular charging bay assemblies separately manufactured from the main kiosk assembly but in communication with the main kiosk assembly, wherein the selected number n is equal to or greater than 1. The selected number n of modular charging bay assemblies each includes at least one lockable slot respectively receiving one of the portable electronic devices in the inventory of the portable electronic devices, and the selected number n of modular charging bay assemblies each further include charging circuitry to recharge one of the portable electronic devices when received in the at least one lockable slot. Based upon the accepted unique login information from an authorized user and an evaluation of a revocable privilege status corresponding to the authorized user, the at least one lockable slot in the selected number n of modular charging bay assemblies is unlockable by the main kiosk assembly to securely check-out the portable electronic device that is received in the at least one lockable slot.

Optionally, the main kiosk assembly may include a touch screen monitor, and may also include a telephone handset. The main kiosk assembly and the selected number n of modular charging bay assemblies may be jail-hardened devices that in turn, may be mounted to a support in a correctional facility such as a wall. At least one of the main kiosk assembly and the selected number n of modular charging bay assemblies may include housing that is selectively positionable relative to the support to facilitate service of the configurable computer kiosk system.

The configurable computer kiosk system may include a controller and lock management hardware and software for the respective lockable slots in the selected number n of modular charging bay assemblies. The main kiosk assembly may further include charge management hardware and software for the selected number n of modular charging bay assemblies. At least one indicator of a lock/unlock state of a lockable charging slots or a charging state of the received portable electronic device may also be provided.

The selected number n of modular charging bay assemblies may be at least two. The at least two modular charging bay assemblies may include unequal numbers of lockable slots. The at least two modular charging bay assemblies may respectively include lockable slots configured to accept different sizes of portable electronic devices.

The main kiosk assembly may include a backplate and a housing, with the housing being rotatable relative to the backplate between a service position and a closed position. The housing may be rotatable about 90° relative to the backplate between the service position and the closed position.

The main kiosk assembly may be configured to detect a change in the selected number n of modular charging bay assemblies, and may generate an administrator alert regarding the detected change. The main kiosk assembly may also include dual-power inputs, wherein one of the dual power inputs is a power over Ethernet power input. The main kiosk assembly may include feeding power to the selected number n of modular charging bay assemblies.

Each of the selected number n of modular charging bay assemblies may include a first dock connector for each lockable slot, the first dock connector establishing communication with one of the portable electronic devices when received in the lockable slot. A second dock connector may be connected to the portable electronic device, a cable may extend from the first dock connector, and a third dock connector may be provided at an end of the cable opposite the first docking connector, with the third dock connector interfacing with the first dock connector when the portable electronic device is received in the lockable slot. The portable electronic device may be provided with a housing assembly, with the second dock connector being internal to the housing assembly, and the third dock connector being accessible from an exterior of the housing assembly. The portable electronic device may have a length dimension and a width dimension, the width dimension being less that than the length dimension, and wherein the second dock connector connects to the portable electronic device along the width dimension. The third dock connector may extend alongside the length dimension of the portable electronic device. The housing assembly may define an integrated stand for the portable electronic device.

The configurable computer kiosk system may also include a kiosk services system in communication with the main kiosk assembly, with the kiosk services system providing at least one of audio/video visitation services, email services, web browsing or web content services, phone call services, appointment or scheduling services, financial account services, educational services, and commissary services for incarcerated inmates. The inventory of portable electronic devices may be configured to communicate exclusively with the kiosk services system.

The configurable computer kiosk system may further include at least one administrator computer device, and the at least one administrator computer device may be provided with at least one administrator user interface for monitoring and management of the inventor of portable electronic devices. The at least one administrator user interface may present an option to block or unblock a use of selected ones of the portable electronic devices in the inventory of portable electronic devices; may present an option to schedule auto-updates of software for the inventory of portable electronic devices; may present an option to commission a safe mode of selected ones of the portable electronic devices in the inventory of portable electronic devices; may present detected hacking attempt information for the inventory of portable electronic devices; may present an option to manually or automatically enroll the pre-registered population of users; may present an option to enroll the inventory of portable electronic devices to be identified, managed and reported by the computer kiosk system; may present app management options for the inventory of portable electronic devices; and/or may include a find device alarm option.

The inventory of portable electronic devices may include tablet computer devices. The pre-registered population of users may be a population of incarcerated inmates, wherein the revocable privileges status is determined by a correctional facility in view of inmate status and behavioral considerations as applied to each pre-registered inmate in the population of incarcerated inmates. The inventory of portable electronic devices may be configured to conduct secure video visitation sessions between incarcerated inmates and local or remotely located visitors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dynamically configurable computer kiosk system for securely managing an inventory of portable electronic devices across a variable pre-registered population of incarcerated inmates in a correctional facility over time, the configurable computer kiosk system comprising:

a database including correctional facility data and information, authorized incarcerated inmate information and data for the pre-registered population of authorized incarcerated inmates in the correctional facility, revocable inmate privilege information and data for the pre-registered population of authorized incarcerated inmates in the correctional facility, and non-inmate user data;

wherein the revocable inmate privilege information and data is a dynamically changeable inmate privilege status over time in response to individual inmate behavioral considerations in the correctional facility or to security concerns of the correctional facility overall;

a tamper proof main kiosk housing in the correctional facility, the main kiosk operative in response to receiving the authorized incarcerated inmate information and data in the database and to accepting unique login information from any of the pre-registered population of incarcerated inmates, comparing the accepted unique login information to the authorized incarcerated inmate information and data in the database to confirm an authorized access to the main kiosk; and at least two or more of modular add-on charging bays in the correctional facility, a number of modular add-on charging bays respectively configured to be separately added onto the main kiosk and each of the portable electronic devices in the inventory being selectively positionable relative to the number of modular add-on charging bays, the number of add-on charging bays configured to connect, communicate with, and be controlled by the main kiosk, wherein by virtue of the add-on charging bays the number of add-on charging bays is initially selectable to simultaneously receive and secure an entire initial inventory size of portable electronic devices for a first population size of authorized incarcerated inmates in the correctional facility, and wherein by virtue of the add-on charging bays the number of add-on charging bays is subsequently changeable to simultaneously receive and secure an entirety of another inventory size of portable electronic devices which is larger or smaller than the initial inventory size as the population of authorized incarcerated inmates increases or decreases over time;

wherein each of the add-on charging bays includes stationary lockable slots, the stationary lockable slots respectively receiving and securing one of the portable electronic devices in the inventory in a locked check-in state, and each of the add-on charging bay further including charging circuitry configured to charge and recharge the portable electronic devices in the inventory while the portable electronic device is in the locked check-in state;

wherein the main kiosk is further configured to, when an authorized access to the main kiosk has been confirmed, verify the inmate privilege status based on the accepted unique login information and the revocable inmate privilege information and data in the database, and in response to the verified inmate privilege status either securely maintain the locked checked-in state of the portable electronic devices in the modular add-on charging bays in locked state or execute an unlocked check-out state of at least one of the portable electronic devices, wherein the execution of the unlocked state includes where the main kiosk sends an unlock signal to a particular lock of the modular add-on charging bay, wherein in the unlocked state the portable electronic device is entirely removable from one of the stationary lockable slots of one of the number of add-on charging bays for use in the correctional facility;

wherein the main kiosk includes a controller and lock management hardware and software for operating at least one locking mechanism for the stationary lockable slots in each one of the number of add-on charging bays;

wherein the two or more modular add on charging bays includes first and second add on charging bays respectively including stationary lockable slots, the first and second add on charging bays having different numbers of stationary lockable slots; and wherein the main kiosk and the at least two modular add-on charging bays are separately manufactured in a modular, plug and play form.

2. The configurable computer kiosk system according to claim 1, wherein the main kiosk includes a touch screen.

3. The configurable computer kiosk system according to claim 1, wherein the main kiosk includes a telephone handset having a mouthpiece, an ear piece and a finger grip portion therebetween.

4. The configurable computer kiosk system according to claim 1, wherein the main kiosk and the number of add-on charging bays are jail-hardened devices meeting applicable security needs of the correctional facility.

5. The configurable computer kiosk system according to claim 4, wherein the main kiosk and the number of add-on charging bays are each configured to be separately and securely fastened and anchored to an external support structure inside the correctional facility.

6. The configurable computer kiosk system according to claim 5, wherein the main kiosk and the number of add-on charging bays are each configured to be separately mounted to a vertically extending wall surface inside the correctional facility.

7. The configurable computer kiosk system according to claim 1, wherein the main kiosk further includes charge management hardware and software for operating the charging circuitry in the stationary lockable slots of the number of add-on charging bays.

8. The configurable computer kiosk system according to claim 7, wherein of the main kiosk or the number of add-on charging bays further includes at least one indicator of a lock/unlock status of a lockable slot or a battery charge status of the portable electronic device received in the respective stationary lockable slots.

9. The configurable computer kiosk system according to claim 1, wherein the two or more add-on charging bays includes first and second add-on charging bays respectively having an unequal number of stationary lockable slots.

10. The configurable computer kiosk system according to claim 1, wherein the main kiosk includes a vertically extending wall mounted backplate and a housing supported by the backplate, the housing being rotatable relative to the vertically extending wall mounted backplate and an existing wall in the correctional facility between a service position providing access to internal components of the main kiosk and a closed position securely protecting the internal components of the main kiosk in the correctional facility.

11. The configurable computer kiosk system according to claim 10, wherein the housing is rotatable about 90° between the service position and the closed position.

12. The configurable computer kiosk system according to claim 1, wherein the main kiosk is configured to automatically detect a change in the number of add-on charging bays being controlled by the main kiosk in the correctional facility.

13. The configurable computer kiosk system according to claim 12, wherein the automatically detected change in the number of add-on charging bay being controlled by the main kiosk causes the main kiosk to generate an administrator alert to a non-inmate user according to the non-inmate user data in the database.

14. The configurable computer kiosk system according to claim 1, wherein the main kiosk includes dual-power inputs.

15. The configurable computer kiosk system according to claim 14, wherein one of the dual power inputs is a power over Ethernet power input.

16. The configurable computer kiosk system according to claim 1, wherein the main kiosk includes a main circuit board, the main circuit board feeding power to lock mechanisms and charging circuitry in the number of add-on charging bays.

17. The configurable computer kiosk system according to claim 16, wherein each of the stationary lockable slots in each add-on charging bay includes a first dock connector interface, the first dock connector interface establishing a connection to a charging and/or data port of one of the portable electronic devices when received in the stationary lockable slot.

18. The configurable computer kiosk system according to claim 17, further comprising a cable extending between the first dock connector interface and the charging and/or data port of one of the portable electronic devices in the locked check-in state, the cable including a connector engaging the charging and/or data port and supplying charging power to one of the portable electronic devices when received in the stationary lockable slot, and the cable being removable from the stationary lockable slot in the unlocked check-out state.

19. The configurable computer kiosk system according to claim 18, wherein each of the portable electronic devices is provided with a housing assembly, and wherein the cable extends interior to the housing assembly.

20. The configurable computer kiosk system according to claim 18, wherein each of the portable electronic devices and each of the stationary lockable slots has a lengthwise dimension and a widthwise dimension, the widthwise dimension being less than the length dimension, and the cable and first dock connector interface establishing a connection to charging circuitry for the stationary lockable slot along the lengthwise dimension, and the cable and the connector establishing a connection to the charging and/or data port of the portable electronic device in the widthwise dimension.

21. The configurable computer kiosk system according to claim 17, wherein the portable electronic devices are provided with a protective housing including an integrated stand, and the protective housing being configured to be at least partly received in one of the stationary lockable slots.

22. The configurable computer kiosk system according to claim 1, further comprising a correctional facility kiosk services system in communication with the main kiosk, the correctional facility kiosk services system providing, through checked-out ones of the portable electronic devices in the inventory which have been removed from the number of add-on charging bays, at least one of audio/video visitation services, email services, web browsing or web content services, phone call services, appointment or scheduling services, financial account services, educational services, or commissary services for the population of authorized incarcerated inmates in the correctional facility.

23. The configurable computer kiosk system according to claim 22, wherein the inventory of portable electronic devices are configured to communicate exclusively with the correctional facility kiosk services system.

24. The configurable computer kiosk system according to claim 1, further comprising at least one administrator computer device provided with at least one administrator user interface accessible by an authorized non-inmate user according to the non-inmate user data in the database for monitoring and management of the inventory of portable electronic devices while in the locked check-in state and also when removed from the lockable stationary slots for use by authorized incarcerated inmates in the correctional facility.

25. The configurable computer kiosk system according to claim 24, wherein the at least one administrator user interface presents an option to the non-inmate user to enable or disable a use of selected ones of the portable electronic devices in the inventory of portable electronic devices in the correctional facility while the selected ones of the portable electronic devices in the inventory are removed from the stationary lockable slots.

26. The configurable computer kiosk system according to claim 24, wherein the at least one administrator user interface presents an option to the non-inmate user to schedule auto-updates of software for the inventory of portable electronic devices in the correctional facility while in the locked check-in state.

27. The configurable computer kiosk system according to claim 24, wherein the at least one administrator user interface presents an option to the non-inmate user to commission a safe mode of selected ones of the portable electronic devices in the inventory of portable electronic devices in the correctional facility for particular ones of the authorized incarcerated inmate users.

28. The configurable computer kiosk system according to claim 24, wherein the at least one administrator user interface presents detected hacking attempt information to the non-inmate user for improper use of any of portable electronic devices in the inventory at the correctional facility by one or more of the authorized incarcerated inmate users, wherein the detected hacking attempt involves an unusual use or an unusual pattern of use of any of the portable electronic devices by in the inventory by an authorized incarcerated inmate user.

29. The configurable computer kiosk system according to claim 24, wherein the at least one administrator user interface presents an option to the non-inmate user to manually or automatically enroll authorized-incarcerated inmates in the pre-registered population of authorized incarcerated inmates in the correctional facility.

30. The configurable computer kiosk system according to claim 24, wherein the at least one administrator user interface presents an option to the non-inmate user to enroll the portable electronic devices in the inventory, thereby allowing the portable electronic devices in the inventory to be individually identified, managed and reported by the configurable computer kiosk system in the correctional facility and for the non-inmate user to respond to particular usage conditions of any of the portable electronic devices in the inventory on an individual or group basis in the correctional facility.

31. The configurable computer kiosk system according to claim 24, wherein the at least one administrator user interface presents app management options to the non-inmate user for the inventory of portable electronic devices in the correctional facility.

32. The configurable computer kiosk system according to claim 24, wherein the at least one administrator user interface includes a find device alarm option to the non-inmate user to locate each respective one of the portable electronic devices in the inventory inside the correctional facility.

33. The configurable computer kiosk system according to claim 1, wherein the inventory of portable electronic devices comprises tablet computer devices.

34. The configurable computer kiosk system according to claim 33, wherein the tablet computer devices are configured to conduct secure video visitation sessions between incarcerated inmates in the correctional facility and local or remotely located visitors.

35. The configurable computer kiosk system according to claim 1, wherein the number of add-on charging bays respectively include a front face having a common and continuous height dimension extending between an upper edge and a lower edge and elongated access openings extending between the upper edge and the lower edge, and wherein the main kiosk and the number of add-on charging bays are arranged beside one another with the elongated access openings in the main kiosk and the number of charging bays being aligned and parallel to one another.

36. The configurable computer kiosk system according to claim 35, wherein the stationary lockable slots in the number of add-on charging bays are respectively sized to receive a single portable electronic device through the elongated access openings in the front face, and wherein the stationary lockable slots extend vertically while being horizontally spaced apart on the front face.

37. The configurable computer kiosk system according to claim 1, wherein the main kiosk includes a predetermined number of charging slots collectively receiving a first portion of the inventory of portable electronic devices in the correctional facility, and the number of add-on charging bays collectively receiving a second portion of the inventory of portable electronic devices in the correctional facility, wherein the first portion and the second portion in combination meet unique inventory needs of the population of incarcerated inmates in the correctional facility without a custom fabricated computer kiosk system.

38. The configurable computer kiosk system according to claim 1, wherein the number of add-on charging bays includes at least one add-on charging bay including four stationary lockable slots.

39. The configurable computer kiosk system according to claim 1, wherein the number of add-on charging bays includes at least one add-on charging bay wherein the stationary lockable slots extend perpendicularly to a front face of the add-on charging bay.

40. The configurable computer kiosk system according to claim 1, wherein the portable electronic devices in the inventory each have a long lengthwise dimension and a short widthwise dimension, the stationary lockable slots in each of the add on charging bays having an opening shaped to receive a widthwise insertion of one of the portable electronic devices.

41. The configurable computer kiosk system according to claim 40, wherein the portable electronic device protrudes from the at least one stationary lockable slot when the portable electronic device is in the locked check-in state.

42. The configurable computer kiosk system according to claim 1, wherein the charging circuitry in each of the stationary lockable slots is non-inductive.

43. The configurable computer kiosk system according to claim 1, wherein the charging circuitry for each of the stationary lockable charging slots is activated and deactivated on a set schedule.

44. The configurable computer kiosk system according to claim 1, wherein the stationary lockable slots are individually lockable.

45. The configurable computer kiosk system according to claim 1, wherein the stationary lockable slots are remotely lockable and unlockable.

46. The configurable computer kiosk system according to claim 17, wherein the charging and/or data port of one of the portable electronic devices includes a USB port, micro-USB port, a lightning port, or a pin dock connector.

47. The configurable computer kiosk system of claim 46, wherein the charging and/or data port of one of the portable electronic devices is aligned and matingly engaged with a docking interface of each when stationary lockable slot as the portable electronic device is being received in the stationary lockable slot.

\* \* \* \* \*